US012399528B2

(12) United States Patent
Chung et al.

(10) Patent No.: US 12,399,528 B2
(45) Date of Patent: Aug. 26, 2025

(54) ELECTRONIC DEVICE INCLUDING FLEXIBLE DISPLAY AND METHOD FOR CONTROLLING INPUT AREA FOR EXPANSION AND REDUCTION OF DISPLAY IN THE ELECTRONIC DEVICE

(71) Applicant: SAMSUNG ELECTRONICS CO., LTD., Suwon-si (KR)

(72) Inventors: Jaewoong Chung, Suwon-si (KR); Sanghyuk Koh, Suwon-si (KR); Minsoo Kim, Suwon-si (KR); Juyeoung Kim, Suwon-si (KR); Seonkeun Park, Suwon-si (KR); Sunghoon Lee, Suwon-si (KR); Jungwon Lee, Suwon-si (KR); Hanchul Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 512 days.

(21) Appl. No.: 17/964,041

(22) Filed: Oct. 12, 2022

(65) Prior Publication Data
US 2023/0110166 A1 Apr. 13, 2023

Related U.S. Application Data

(63) Continuation of application No. PCT/KR2022/015285, filed on Oct. 11, 2022.

(30) Foreign Application Priority Data

Oct. 12, 2021 (KR) .......... 10-2021-0135185
Jan. 28, 2022 (KR) .......... 10-2022-0013163

(51) Int. Cl.
G06F 1/16 (2006.01)
G06F 3/0482 (2013.01)
G06F 3/0488 (2022.01)

(52) U.S. Cl.
CPC .......... *G06F 1/1624* (2013.01); *G06F 1/1652* (2013.01); *G06F 1/1677* (2013.01);
(Continued)

(58) Field of Classification Search
CPC .................................................. G06F 1/1624
(Continued)

(56) References Cited

U.S. PATENT DOCUMENTS 11,043,191 B1 * 6/2021 Kang .......... G09G 5/10
11,184,987 B1 * 11/2021 Jung .......... H05K 5/0217
(Continued)

FOREIGN PATENT DOCUMENTS

KR 10-2016-0013289 A 2/2016
KR 10-2016-0092776 A 8/2016
(Continued)

OTHER PUBLICATIONS

International Search Report mailed Jan. 12, 2023 for PCT/KR2022/015285.

Primary Examiner — Reza Nabi
(74) Attorney, Agent, or Firm — CANTOR COLBURN LLP

(57) ABSTRACT

An electronic device includes: a first housing, a second housing for accommodating the first housing to enable sliding of the first housing, a flexible display connected to the first housing, a slide driving unit for slidingly moving the first housing, and a processor. The processor identifies a reduced state where the flexible display is slid in a reduction direction or an expanded state where the flexible display is slid in an expansion direction, in the reduced state, identifies a first edge area of the flexible display as a first input area and controls the flexible display to enter the expanded state, based on an input through the first input area, and in the expanded state, identifies a second edge area of the flexible
(Continued)

display as a second input area and controls the flexible display to enter the reduced state, based on an input through the second input area.

20 Claims, 20 Drawing Sheets

(52) U.S. Cl.
CPC .......... G06F 3/0482 (2013.01); G06F 3/0488 (2013.01); *G06F 2203/04803* (2013.01)

(58) Field of Classification Search
USPC .......................................................... 715/788
See application file for complete search history.

(56) References Cited

U.S. PATENT DOCUMENTS

| | | | | |
|---|---|---|---|---|
| 12,034,879 | B1* | 7/2024 | Kushwaha | H04M 1/0268 |
| 12,035,035 | B1* | 7/2024 | Kumar Agrawal | H04N 23/631 |
| 2010/0167791 | A1* | 7/2010 | Lim | G06F 1/1624 |
| | | | | 455/566 |
| 2016/0373654 | A1* | 12/2016 | Kwon | G09G 5/373 |
| 2017/0011714 | A1* | 1/2017 | Eim | G06F 1/1677 |
| 2018/0348881 | A1* | 12/2018 | Chung | H04W 88/02 |
| 2019/0261519 | A1* | 8/2019 | Park | G06F 1/1652 |
| 2020/0076940 | A1* | 3/2020 | Kim | G06F 1/1656 |
| 2020/0105169 | A1* | 4/2020 | Jeong | H10K 77/111 |
| 2020/0264673 | A1* | 8/2020 | Kim | G06F 1/1652 |
| 2020/0264674 | A1* | 8/2020 | Km | G06F 1/1681 |
| 2021/0201721 | A1* | 7/2021 | Li | G09G 3/035 |
| 2021/0201722 | A1* | 7/2021 | Jeong | G09F 9/37 |
| 2021/0247805 | A1* | 8/2021 | Min | H04M 1/0243 |
| 2021/0278878 | A1* | 9/2021 | Shim | G06F 1/1656 |
| 2021/0352813 | A1* | 11/2021 | Cho | G06F 1/1656 |
| 2022/0113842 | A1* | 4/2022 | Kim | H04M 1/0268 |
| 2022/0148464 | A1* | 5/2022 | Kwak | G06F 1/1643 |
| 2022/0148473 | A1* | 5/2022 | Kim | G06F 1/1652 |
| 2022/0335869 | A1* | 10/2022 | Kwak | G06F 1/1624 |
| 2022/0368784 | A1* | 11/2022 | Koh | G06F 1/16 |
| 2022/0383786 | A1* | 12/2022 | Kwak | G06F 1/1643 |
| 2022/0390983 | A1* | 12/2022 | Gao | G09F 9/30 |
| 2023/0007111 | A1* | 1/2023 | Lee | H04M 1/0268 |
| 2023/0021496 | A1* | 1/2023 | Choi | H01Q 1/521 |
| 2023/0039953 | A1* | 2/2023 | Seger, Jr | G06F 3/0416 |
| 2023/0093986 | A1* | 3/2023 | Eom | H04M 1/0235 |
| | | | | 361/679.27 |
| 2023/0109078 | A1* | 4/2023 | Li | G06F 1/1626 |
| | | | | 345/173 |
| 2023/0110166 | A1* | 4/2023 | Chung | G06F 1/1677 |
| | | | | 361/679.01 |
| 2023/0122508 | A1* | 4/2023 | Kim | G06F 1/1679 |
| | | | | 318/558 |
| 2023/0130795 | A1* | 4/2023 | Yoon | H04M 1/0268 |
| | | | | 361/807 |
| 2023/0176720 | A1* | 6/2023 | Cheon | G06F 1/1624 |
| | | | | 345/173 |
| 2023/0389243 | A1* | 11/2023 | Cho | H05K 7/20963 |
| 2024/0126325 | A1* | 4/2024 | Kumar Agrawal | G06F 1/1677 |
| 2024/0129394 | A1* | 4/2024 | Vashist | H04M 1/0241 |
| 2024/0192726 | A1* | 6/2024 | Manning | G06F 1/1618 |
| 2024/0196550 | A1* | 6/2024 | Cho | G06F 1/1624 |
| 2024/0203310 | A1* | 6/2024 | Noh | G06F 1/1681 |
| 2024/0223686 | A1* | 7/2024 | Kim | H04M 1/0241 |
| 2024/0302883 | A1* | 9/2024 | Prabhu | G06F 1/1677 |
| 2024/0310878 | A1* | 9/2024 | Pailla | G06F 1/1652 |
| 2024/0385660 | A1* | 11/2024 | Zeng | H04M 1/0268 |
| 2025/0008672 | A1* | 1/2025 | Lee | H01Q 1/243 |
| 2025/0030789 | A1* | 1/2025 | Cho | H04M 1/0237 |

FOREIGN PATENT DOCUMENTS

| | | |
|---|---|---|
| KR | 10-1784880 B1 | 10/2017 |
| KR | 10-2256042 B1 | 5/2021 |
| KR | 10-2021-0113805 A | 9/2021 |
| KR | 20210146095 A | 12/2021 |
| KR | 20220014751 A | 2/2022 |
| KR | 20220077062 A | 6/2022 |
| KR | 20230014279 A | 1/2023 |
| WO | 2021-045275 A1 | 3/2021 |
| WO | 2021-095925 A1 | 5/2021 |
| WO | 2021-160276 A1 | 8/2021 |

* cited by examiner

ELECTRONIC DEVICE INCLUDING FLEXIBLE DISPLAY AND METHOD FOR CONTROLLING INPUT AREA FOR EXPANSION AND REDUCTION OF DISPLAY IN THE ELECTRONIC DEVICE

CROSS-REFERENCE TO RELATED APPLICATION(S)

This application is a continuation of International Application No. PCT/KR2022/015285 designating the United States, filed on Oct. 11, 2022, in the Korean Intellectual Property Receiving Office and claiming priority to Korean Patent Application No. 10-2021-0135185, filed on Oct. 12, 2021, in the Korean Intellectual Property Office, and to Korean Patent Application No. 10-2022-0013163, filed on Jan. 28, 2022, in the Korean Intellectual Property Office, the disclosures of all of which are incorporated by reference herein in their entireties

TECHNICAL FIELD

Various embodiments relate to an electronic device including a flexible display.

BACKGROUND ART

In line with development of electronics, information, and communication technologies, various functions are integrated into a single portable communication device or electronic device. For example, a smartphone includes not only a communication function, but also the function of a music player, an imaging device, or an electronic wallet, and more diversified functions may be implemented in the smartphone by installing additional applications.

In line with widespread use of personal or portable communication devices such as smartphones, there have been increasing user demands for portability and use convenience. For example, a touchscreen display is an output device for outputting visual information (for example, screen), and may also provide a virtual keypad which replaces a mechanical input device (for example, button-type input device). As a result, the portable communication device or electronic device has become able to provide identical or more improved utility (for example, larger screen) while having a compact size. On the other hand, it is expected that commercialization of flexible displays, for example, foldable or rollable display, will further improve the portability and use convenience of electronic devices.

DISCLOSURE

Technical Problem

An electronic device including a flexible display may be implemented such that structures of the electronic device can relatively move (for example, slide, spin, or rotate) with respect to each other. For example, the flexible display may provide an extension structure following a sliding movement when some structures (for example, a first housing and a partial area of the flexible display) has moved into or away from another structure (for example, a second housing). For example, the flexible display may perform a slide-in or slide-out operation (for example, sliding movement) in the electronic device, thereby expanding or reducing the display (or display area). The electronic device may automatically perform a side-in or slide-out operation of the flexible display based on a designated trigger (for example, user input).

The electronic devices may automatically perform side-in or slide-out operations of flexible displays in various user input types, including a physical button input type, a software button input type, and a gesture input type. However, conventional user input types simply use physical or software-based button touches (or pressing) like other input types, or use gestures which are also used by other functions, and user may thus need to recognize and learn the input type, or may be confused even after learning the same.

Technical Solution

Various embodiments of the disclosure may provide an electronic device including a flexible display, wherein an input for sliding of the flexible display (or expansion and reduction of the display) can be performed more intuitively and conveniently, and a method for controlling an input area for display expansion and reduction in the electronic device including a flexible display.

Various embodiments of the disclosure may provide an electronic device including a flexible display, wherein an input area is configured in the siding direction of the flexible display (for example, the direction in which the display is expanded or reduced), and inputs can be performed through the configured input area such that the user can easily make an input for expanding or reducing the display in an intuitive manner, an input for sliding of the flexible display (or expansion and reduction of the display) can be performed more intuitively and conveniently, and a method for controlling an input area for display expansion and reduction in the electronic device including a flexible display.

According to an embodiment of the disclosure, an electronic device includes a first housing, a second housing configured to accommodate at least a portion of the first housing and connected to the first housing to enable sliding of the first housing, a flexible display connected to the first housing, a slide driving unit configured to slidingly move the first housing and the flexible display in an expansion direction or a reduction direction opposite to the expansion direction, and at least one processor. The at least one processor is configured to, identify a reduced state in which the flexible display is slid in the reduction direction or an expanded state in which the flexible display is slid in the expansion direction, in the reduced state, identify a first edge area of the flexible display disposed in the reduction direction from a center of the flexible display as a first input area and control the slide driving unit such that the flexible display enters the expanded state, based on reception of a first input through the first input area, and in the expanded state, identify a second edge area of the flexible display disposed in the expansion direction from the center of the flexible display as a second input area and control the slide driving unit such that the flexible display enters the reduced state, based on reception of a second input through the second input area.

According to an embodiment of the disclosure, a method for controlling an input area for expansion and reduction of a display in an electronic device may include identifying a reduced state in which a flexible display is slid in a reduction direction or an expanded state in which the flexible display is slid in an expansion direction, in the reduced state, identifying a first edge area of the flexible display disposed in the reduction direction from a center of the flexible display as a first input area and performing control such that the flexible display enters the expanded state, based on reception of a first input through the first input area, and in the expanded state, identifying a second edge area of the flexible display disposed in the expansion direction from the center of the flexible display as a second input area and performing control such that the flexible display enters the reduced state, based on reception of a second input through the second input area.

According to an embodiment of the disclosure, in connection with a non-volatile storage medium storing instructions, the instructions may, when executed by at least one process, cause an electronic device comprising at least one processor to perform at least one operation, the at least one operation including identifying a reduced state in which a flexible display is slid in a reduction direction or an expanded state in which the flexible display is slid in an expansion direction, in the reduced state, identifying a first edge area of the flexible display disposed in the reduction direction from a center of the flexible display as a first input area and performing control such that the flexible display enters the expanded state, based on reception of a first input through the first input area, and in the expanded state, identifying a second edge area of the flexible display disposed in the expansion direction from the center of the flexible display as a second input area and performing control such that the flexible display enters the reduced state, based on reception of a second input through the second input area.

According to an embodiment of the disclosure, an electronic device includes: a first housing; a second housing configured to accommodate at least a portion of the first housing and including an open side through which the first housing is slidable; a flexible display connected to the first housing; a slide driving unit configured to slidingly move the first housing and the flexible display in an expansion direction or a reduction direction opposite the expansion direction; and at least one processor. The at least one processor is configured to identify a reduced state in which the flexible display is slid in the reduction direction or an expanded state in which the flexible display is slid in the expansion direction, in the reduced state, identify a first edge area of the flexible display corresponding to a sidewall of the second housing as a first input area and control the slide driving unit such that the flexible display enters the expanded state, based on reception of a first input through the first input area, and in the expanded state, identify a second edge area of the flexible display corresponding to an outermost sidewall of the first housing as a second input area and control the slide driving unit such that the flexible display enters the reduced state, based on reception of a second input through the second input area. The sidewall of the second housing is disposed opposite to the open side, and the outermost sidewall of the first housing is disposed opposite to the sidewall of the second housing.

Advantageous Effects

According to various embodiments of the disclosure, an input for sliding of a flexible display (or expansion and reduction of the display) can be performed more intuitively and conveniently in an electronic device.

According to various embodiments of the disclosure, an input area is configured in the siding direction of a flexible display (for example, the direction in which the display is expanded or reduced), and inputs can be performed through the configured input area such that the user can make an input for expanding or reducing the display in an intuitive and easy manner in an electronic device.

Advantageous effects obtainable from the disclosure may not be limited to the above mentioned effects, and other effects which are not mentioned may be clearly understood, through the following descriptions, by those skilled in the art to which the disclosure pertains.

DESCRIPTION OF THE DRAWINGS

In connection with the description of the drawings, the same or similar reference numerals may be used for the same or similar elements.

MODE FOR INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 1:
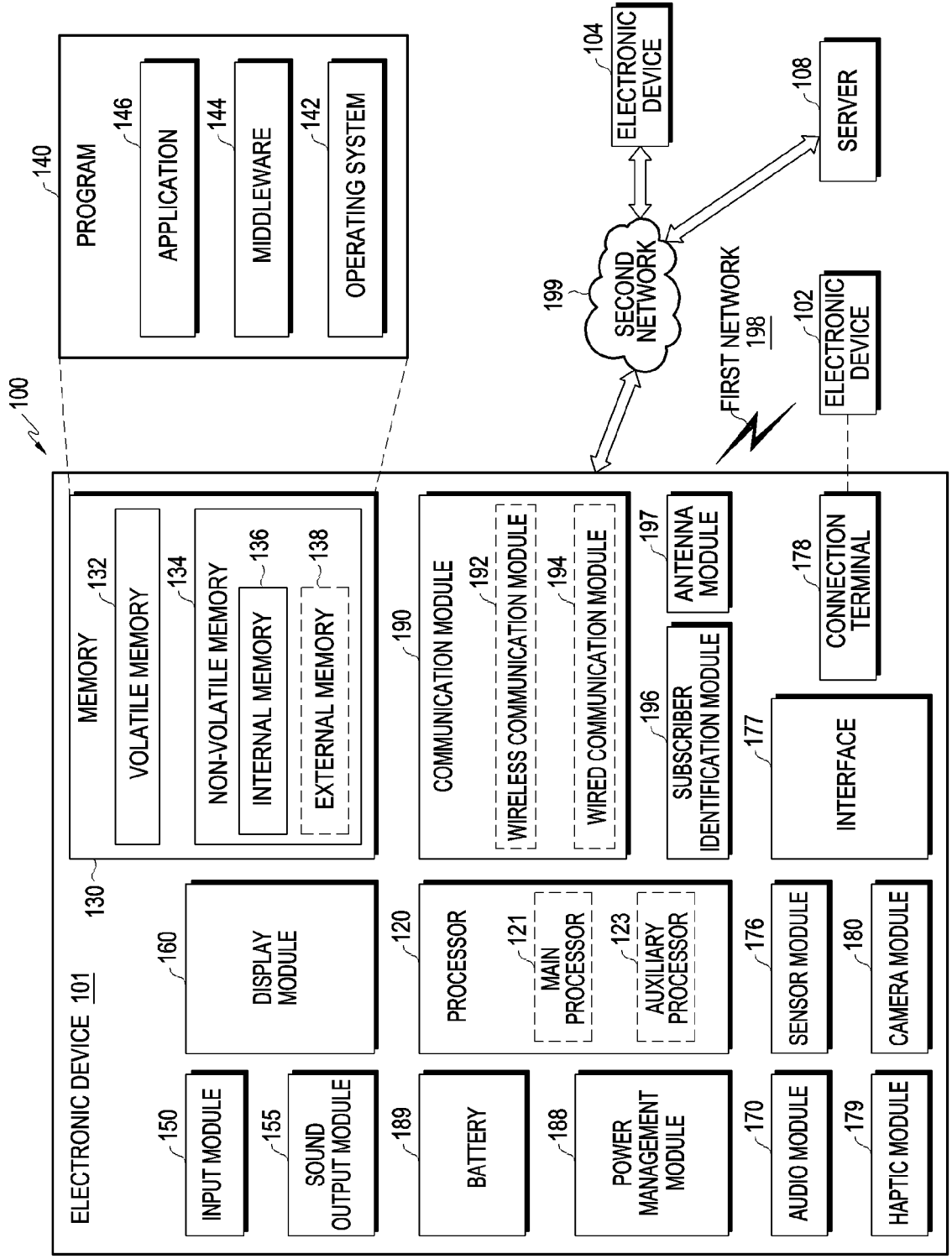
FIG. 1 is a block diagram of an electronic device in a network environment according to one embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1 eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
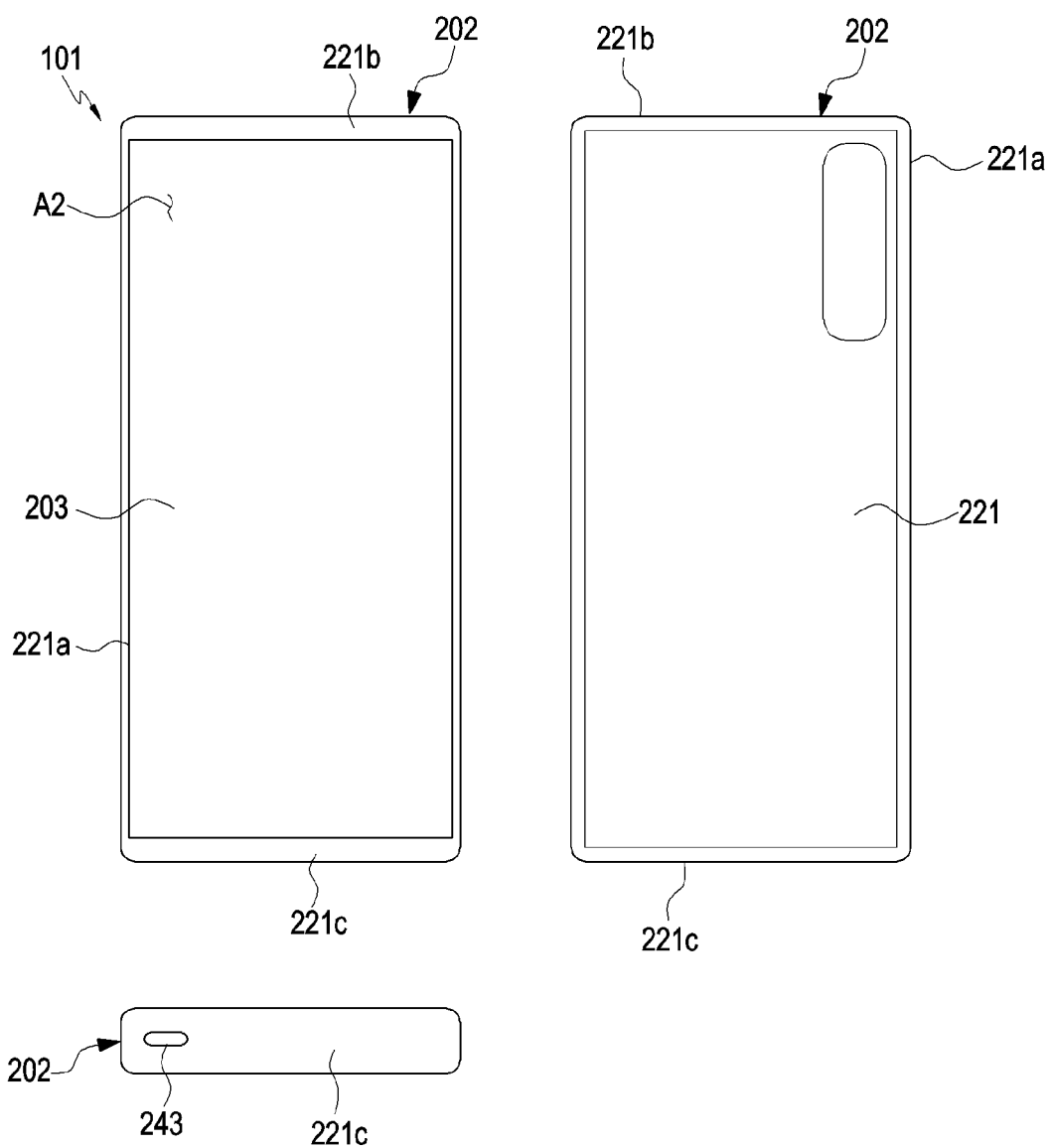
FIG. 2A illustrates a state in which a second display area of a flexible display is accommodated in a second housing according to one embodiment.
Figure 2B:
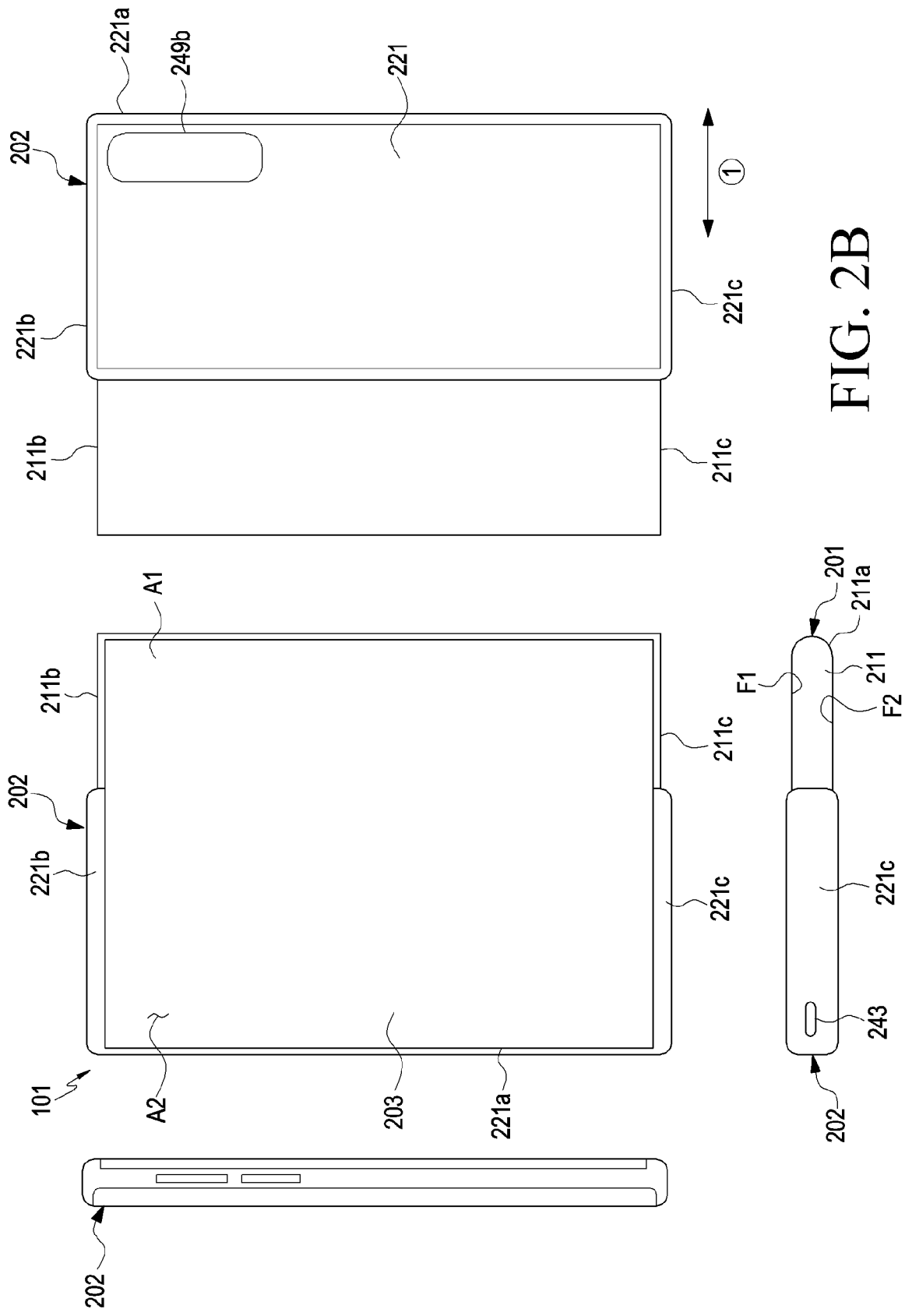
FIG. 2B illustrates a state in which a second display area of a flexible display is exposed to the outside of a second housing according to one embodiment.

FIG. 2A illustrates a state in which a second display area of a flexible display is accommodated in a second housing according to one embodiment. FIG. 2B illustrates a state in which a second display area of a flexible display is exposed to the outside of a second housing according to one embodiment.

FIGS. 2A and 2B illustrate a structure expanding in the right direction of the flexible display 203 when viewed from the front of the electronic device 101. The state shown in FIG. 2A may be defined as a state in which the first housing 201 is closed with respect to the second housing 202 (hereinafter "closed state"), and the state shown in FIG. 2B may be defined as a state in which the first housing 201 is opened with respect to the second housing 202 (hereinafter "open state"). According to an embodiment, a "closed state" or an "open state" may be defined as a state in which the electronic device is closed or opened.

Referring to FIGS. 2A and 2B, the electronic device 101 may include housings 201 and 202. The housings 201 and 202 may include a second housing 202 and a first housing 201 movably disposed with respect to the second housing 202. In an embodiment, the electronic device 101 may be interpreted as having a structure in which the second housing 202 is slidably disposed on the first housing 201. According to one embodiment, the first housing 201 may be arranged to reciprocate by a predetermined distance in a direction shown with reference to the second housing 202, for example, directions indicated by arrow ①. The configuration of the electronic device 101 of FIGS. 2A and 2B may be entirely or partially the same as that of the electronic device 101 of FIG. 1.

According to one embodiment, the first housing 201 may be referred to as, for example, a first structure, a slide unit, or a slide housing, and may be reciprocally disposed on the second housing 202. According to one embodiment, the first housing 201 may accommodate various electrical and electronic components such as a circuit board or a battery. The second housing 202 may be referred to as, for example, a second structure, a main unit, or a main housing, and may guide the movement of the first housing 201. A portion of the flexible display 203 (e.g., the first display area A1) may be seated in the first housing 201. According to one embodiment, according to the movement (e.g., sliding movement) of the first housing 201 with respect to the second housing 202, another portion of the flexible display 203 (e.g., the second display area A2) may be accommodated (e.g., slide-in operation) inside the second housing 202 or exposed to the outside (e.g., slide-out operation) of the second housing 202. According to one embodiment, a motor, a speaker, a SIM socket, and/or a sub circuit board electrically connected to the main circuit board may be disposed in the first housing 201. A main circuit board on which electrical components, such as an application processor (AP) and a communication processor (CP), are mounted may be disposed in the second housing 202.

According to one embodiment, the first housing 201 may include a first plate 211 (e.g., a slide plate). The first plate 211 may include a first face (e.g., the first face F1 of FIG.

2B) forming at least a portion of the first plate 211, and a second face F2 facing in the opposite direction of the first face F1. According to one embodiment, the first plate 211 may support at least a portion of the flexible display 203 (e.g., the first display area A1). According to one embodiment, the first housing 201 may include the first plate 211, a 1-1$^{th}$ sidewall 211a (in other word, outermost sidewall) extending from the first plate 211 in an expansion direction, a 1-2$^{th}$ sidewall 211b extending from the 1-1$^{th}$ sidewall 211a and the first plate 211 in a top direction, and a 1-3$^{th}$ sidewall 211c extending from the 1-1$^{th}$ sidewall 211a and the first plate 211 in a bottom direction and parallel to the 1-2$^{th}$ sidewall 211b.

According to one embodiment, the second housing 202 may include a second plate (a main case) 221, a 2-1$^{th}$ sidewall 221a extending from the second plate 221 in a reduction direction, a 2-2$^{th}$ sidewall 221b extending from the 2-1$^{th}$ sidewall 221a and the second plate 221 in a bottom direction, and a 2-3$^{th}$ sidewall 221c extending from the 2-1$^{th}$ sidewall 221a and the second plate 221 in a top direction and parallel to the 2-2$^{th}$ sidewall 221b. According to one embodiment, the 2-2$^{th}$ sidewall 221b and the 2-3$^{th}$ sidewall 221c may be formed to be perpendicular to the 2-1$^{th}$ sidewall 221a. According to one embodiment, the second plate 221, the 2-1$^{th}$ sidewall 221a, the 2-2$^{th}$ sidewall 221b, and the 2-3$^{th}$ sidewall 221c may form a shape having one open side (e.g., a front face) so as to accommodate (or surround) at least a portion of the first housing 201. For example, the first housing 201 may be coupled to the second housing 202 to be at least partially surrounded thereby, and may slide in a direction parallel to the first face F1 and the second face F2, for example, in the directions indicated by arrow ① through the open side of the second housing 202, while being guided by the second housing 202. According to one embodiment, the second plate 221, the 2-1$^{th}$ sidewall 221a, the 2-2$^{th}$ sidewall 221b, and/or the 2-3$^{th}$ sidewall 221c may be integrally formed with each other. According to another embodiment, the second plate 221, the 2-1$^{th}$ sidewall 221a, the 2-2$^{th}$ sidewall 221b, and/or the 2-3$^{th}$ sidewall 221c may be formed as separate housings to be combined or assembled with each other.

According to one embodiment, the second plate 221 and/or the 2-1$^{th}$ sidewall 221a may cover at least a portion of the flexible display 203. For example, at least a portion of the flexible display 203 may be accommodated inside the second housing 202, and the second plate 221 and/or the 2-1$^{th}$ sidewall 221a may cover a portion of the flexible display 203 accommodated inside the second housing 202.

According to various embodiments, the first housing 201 may be movable in a direction (e.g., directions indicated by the arrow ①) parallel to the 2-2$^{th}$ sidewall 221b and the 2-3$^{th}$ sidewall 221c to be in an opened state and a closed state with respect to the second housing 202. The first housing 201 may move to be positioned at a first distance from the 2-1$^{th}$ sidewall 221a in the closed state (i.e., reduced state) and to be positioned at a second distance greater than the first distance from the 2-1$^{th}$ sidewall 221a in the opened state (i.e., expanded state). In an embodiment, in the closed state, the first housing 201 may surround a portion of the 2-1$^{th}$ sidewall 221a.

According to one embodiment, the electronic device 101 may include a flexible display 203, a key input device 241, a connector hole 243, audio modules 247a and 247b (not shown), or a camera module 249a and 249b (not shown). Although not shown, the electronic device 101 may further include an indicator (e.g., an LED device) or various sensor modules. The configuration of the flexible display 203, the audio modules 247a and 247b (not shown), and the camera modules 249a and 249b (not shown) of FIGS. 2A and 2B may be entirely or partially the same as that of the display module 160, the audio module 170, and the camera module 180 of FIG. 1.

According to various embodiments, the flexible display 203 may include a first display area A1 and a second display area A2. According to one embodiment, the first display area A1 may be disposed on the first housing 201. For example, the first display area A1 may extend substantially across at least a portion of the first face F1 to be disposed on the first face F1. The second display area A2 may extend from the first display area A1 and may be inserted or accommodated inside the second housing 202 (e.g., a structure) or may be exposed to the outside of the second housing 202 according to the sliding movement of the first housing 201.

According to various embodiments, the second display area A2 may move while being substantially guided by one area of the first housing 201, so as to be accommodated in a space formed inside the second housing 202 or between the first housing 201 and the second housings 202 or may be exposed to the outside. According to one embodiment, the second display area A2 may move based on the sliding movement of the first housing 201 in the direction (e.g., the directions indicated by arrow ①). For example, while the first housing 201 slides in the reduction direction, a portion of the second display area A2 may be deformed into a curved shape at a position corresponding to a curved surface of the first housing 201.

According to various embodiments, in case that the first housing 201 moves from the closed state to the open state when viewed from the top of the first plate 211 (e.g., a slide plate), the second display area A2 may be gradually exposed to the outside of the second housing 202 and form a substantially flat surface together with the first display area A1. The flexible display 203 may be coupled to or disposed adjacent to a touch sensing circuit, a pressure sensor capable of measuring the intensity (pressure) of a touch, and/or a digitizer that detects a magnetic field type stylus pen. In one embodiment, the second display area A2 may be at least partially accommodated inside the second housing 202, and even in the state (e.g., the closed state) shown in FIG. 2A, a portion of the second display area A2 may be visually exposed to the outside. According to one embodiment, irrespective of the closed state or the opened state, a portion of the exposed second display area A2 may be positioned on a portion of the first housing, and a portion of the second display area A2 may be maintained in a curved surface.

According to one embodiment, the electronic device 101 may include at least one hinge structure (not shown). The hinge structure may connect the first housing 201 and the second housing 202 to each other. For example, the hinge structure may be connected to the first plate 211 and the second plate 221. According to one embodiment, the hinge structure may transmit a driving force for guiding the sliding movement of the first housing 201 to the first housing 201. For example, the hinge structure may include an elastic material (e.g., a spring), and may provide an elastic force in the direction (e.g., directions indicated by the arrow ① of FIG. 2B), based on the sliding movement of the first housing 201. According to one embodiment, the hinge structure may be excluded.

According to one embodiment, the key input device 241 may be positioned in one area of the first housing 201. Depending on the appearance and usage state, the electronic device 101 may be designed such that illustrated key input device 241 is omitted therefrom or an additional key input device(s) is included therein. According to one embodiment, the electronic device 101 may include a key input device which is not shown herein, for example, a home key button or a touch pad disposed around the home key button. According to another embodiment, at least some of the key input devices 241 may be disposed on the 2-1$^{th}$ sidewall 221a, the 2-2$^{th}$ sidewall 221b, or the 2-3$^{th}$ sidewall 221c of the second housing 202.

According to various embodiments, the connector hole 243 may be omitted according to an embodiment, and may accommodate a connector (e.g., a USB connector) for transmitting/receiving power and/or data to and from an external electronic device. Although not shown, the electronic device 101 may include a plurality of connector holes 243, and some of the plurality of connector holes 243 may function as connector holes for transmitting and receiving audio signals to and from an external electronic device. In the illustrated embodiment, the connector hole 243 is disposed on the 2-3$^{th}$ sidewall 221c, but the disclosure is not limited thereto, and may be disposed on the 2-1$^{th}$ sidewall 221a or the 2-2$^{th}$ second sidewall 221b.

According to one embodiment, the first housing 201 may include a first plate 211 and a slide cover (not shown). The first plate 211 and the slide cover (not shown) may be mounted (e.g., at least partially connected to) on the second housing 202, and may move on the second housing 202 in a linear reciprocating motion in a direction (e.g., directions indicated by the arrow ① of FIG. 2B). According to one embodiment, the first plate 211 may support the flexible display 203. For example, the first plate 211 may include a first face F1, and the first display area A1 of the flexible display 203 may be substantially positioned on the first face F1 to be maintained in the form of a flat panel. The slide cover may protect the flexible display 203 positioned on the first plate 211. For example, at least a portion of the flexible display 203 may be positioned between the first plate 211 and the slide cover. According to one embodiment, the first plate 211 and the slide cover may be formed of a metal material and/or a non-metal (e.g., polymer) material. According to one embodiment, the first plate 211 may accommodate at least some (e.g., the battery 189 of FIG. 1, a motor (not shown), and a rack (not shown)) of the components of the electronic device 101. According to various embodiments, at least one or a plurality of substrates may be accommodated in the second housing 202. For example, the second housing 202 may include a circuit board (or a main circuit board) (not shown), and the main circuit board may include a processor, a memory, and/or an interface which are mounted thereon. The processor may include, for example, one or more of a central processing unit, an application processor, a graphics processing unit, an image signal processor, a sensor hub processor, or a communication processor. According to various embodiments, the circuit board may include a flexible printed circuit board type radio frequency cable (FRC). For example, the circuit board may be disposed on at least a portion of the second plate 221, and may be electrically connected to an antenna module (e.g., the antenna module 197 of FIG. 1) and a communication module (e.g., the communication module 190 of FIG. 1).

According to one embodiment, the memory may include, for example, a volatile memory or a non-volatile memory.

According to one embodiment, the interface may include, for example, a high-definition multimedia interface (HDMI), a universal serial bus (USB) interface, an SD card interface, and/or an audio interface. The interface may, for example, electrically or physically connect the electronic device 101 to an external electronic device, and may include a USB connector, an SD card/MMC connector, or an audio connector.

According to one embodiment, the electronic device 101 may further include a separate sub circuit board spaced apart from the circuit board in the second housing 202. The sub circuit board may be electrically connected to a battery or electrical components disposed in the end area of the electronic device 101, such as a speaker and/or a SIM socket, to transmit signals and power.

According to one embodiment, the battery is a device configured to supply power to at least one element of the electronic device 101, and may include, for example, a non-rechargeable primary battery or a rechargeable secondary battery, or a fuel cell. At least a portion of the battery may be disposed on, for example, substantially the same plane as the circuit board. The battery may be integrally disposed inside the electronic device 101, or may be disposed to attachable to or detachable from the electronic device 101.

According to one embodiment, the electronic device 101 may include a motor (not shown) disposed on the second housing 202 (e.g., the second plate 221) and configured to transmit a driving force to a rack (not shown) for guiding the sliding motion of the first housing 201 (e.g., the first plate 211) and a gear (not shown) for rotationally moving along the rack (not city).

Figure 3:
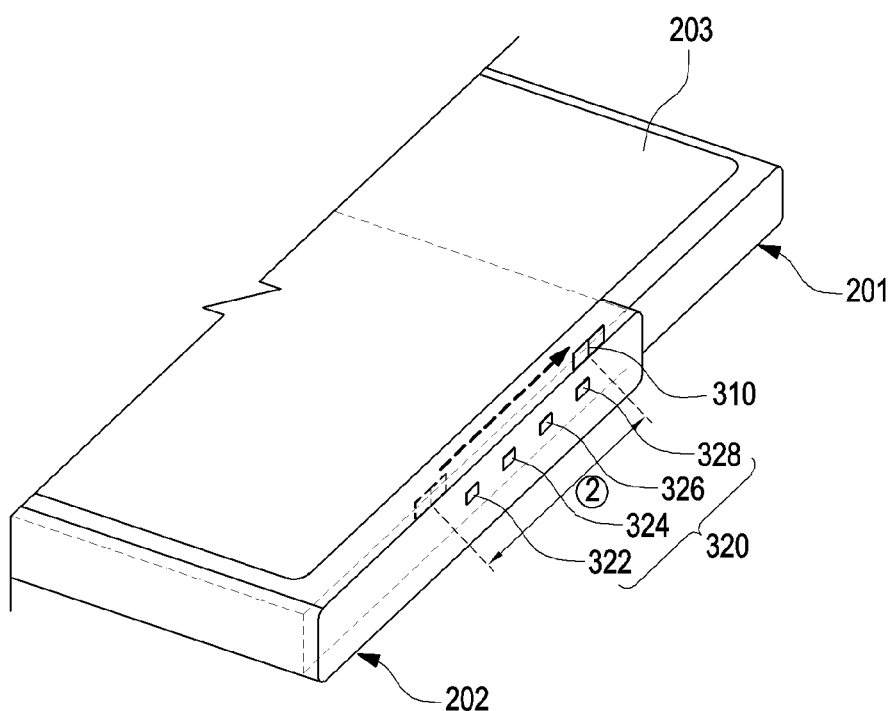
FIG. 3 illustrates a sensing structure for sensing expansion or contraction of a flexible display according to one embodiment.

FIG. 3 illustrates a sensing structure for sensing expansion or reduction of a flexible display according to one embodiment.

Referring to FIG. 3, the electronic device 101 according to one embodiment may include at least one hall sensor (e.g., a hall integrated chip (IC)) 320 in the second housing 202, and a magnetic material (e.g., a magnet) 310 in the first housing 201.

The at least one hall sensor 320 according to one embodiment may include a plurality of hall sensors 322 to 328, and the plurality of hall sensors 322 to 328 may be disposed at a predetermined interval in section ② in which the first housing 201 (or at least a portion of the flexible display 203) moves in a reciprocating motion. Each of the plurality of hall sensors 322 to 328 may detect the strength (or change in the magnetic field) of the magnetic field and may provide information (or data or a value) (e.g., hall IC Raw data (X-axis, Y-axis, and Z-axis data)) of the detected magnetic field strength to a processor (e.g., the processor 120 of FIG. 1). For example, the magnetic field generated by the magnet 310 of the first housing 201 may be detected by the plurality of hall sensors 322 to 328 according to the movement of the first housing 201 (or at least a portion of the flexible display 203) to a slide-out (an opened state) from a slide-in state (a closed state) with respect to the second housing 202, or vice versa. The processor 120 according to one embodiment may identify (confirm or determinate or calculate) a distance (e.g., about several millimeters or centimeters) at which the first housing 201 (or at least a portion of the flexible display 203) is slid out from the second housing 202, based on the information of the magnetic field strength detected from each of the plurality of hall sensors 322 to 328. For example, the processor 120 may identify, in units of about 1 mm, a distance at which the first housing 201 (or at least a portion of the flexible display 203) is slid out from the second housing 202. According to one embodiment, the plurality of hall sensors 322 to 328 has been described as including, for example, four sensors, but the number of hall sensors may be one or more and may not be limited to four sensors. According to one embodiment, an example of identifying a distance by at least one hall sensor and a magnet is given, but the distance at which the first housing 201 (or at least a part of the flexible display 203) is slid out from the second housing 202 may also be identified by other known distance sensing methods. According to one embodiment, contrary to that shown in FIG. 3, the first housing 201 may include at least one hall sensor (e.g., a hall integrated chip) 320, and the second housing 202 may include a magnetic material (e.g., a magnet) 310.

Figure 4:
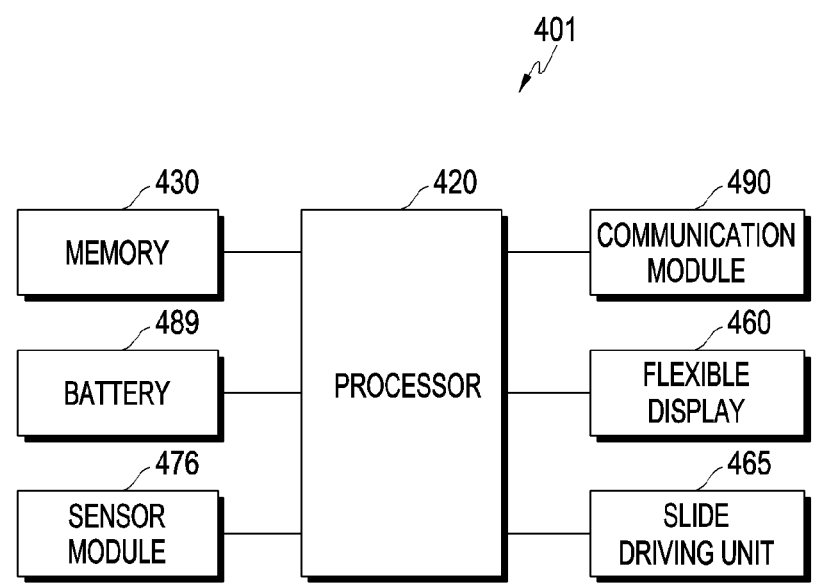
FIG. 4 is a block diagram of an electronic device according to one embodiment.

FIG. 4 is a block diagram of an electronic device according to an exemplary embodiment.

Referring to FIG. 4, According to one embodiment, the electronic device 401 (e.g., the electronic device 101 of FIG. 1) may include at least one processor 420, a memory 430, a flexible display 460, a slide driving unit 465, a sensor module 476, and/or a communication module 490. According to one embodiment, the electronic device 401 is not limited thereto, and may be configured by further including various elements or by excluding some of the elements. According to one embodiment, the electronic device 401 may further include all or a part of the electronic device 101 illustrated in FIG. 1.

According to one embodiment, the flexible display 460 (e.g., the display 160 of FIG. 1 or the flexible display 203 of FIGS. 2A to 2B) (hereinafter also referred to as a display) may be implemented in the form of a touch screen. When the flexible display 460 is implemented together with an input module in the form of a touch screen, the flexible display 460 may display various pieces of information generated according to a user's touch operation. According to one embodiment, the flexible display 460 may be configured to be rollable during a slide-in or slide-out operation. According to one embodiment, based on the slide-in or slide-out operation of the flexible display 460, the flexible display 460 may enter a first state (e.g., an expanded state) in which a screen by the flexible display 460 is expanded or may enter a second state (e.g., a reduced state) in which the screen by the flexible display 460 is reduced. For example, the flexible display 460 may move in the second direction (a slide-out direction) with respect to the first housing 201 and/or the second housing 202 to be in the expanded state (e.g., a partially expanded state or a fully expanded state) in which at least a portion thereof (e.g., A2) is exposed to the front face of the electronic device 101 from the inside of the first housing 201 and/or the second housing 202, and may move in the first direction (e.g., a slide-in direction) opposite to the second direction with respect to the first housing 201 and/or the second housing 202 to be in the reduced state in which at least a portion thereof (e.g., A2) is not exposed to the front face of the electronic device 101.

According to one embodiment, the slide driving unit 465 may include a motor, a gear, and/or a rack, and the motor, the gear, and/or the rack may enable the flexible display 460 (e.g., the first housing 201) (or at least a portion (e.g., A2) of the flexible display 203) to be slid in or out. According to one embodiment, the motor may be driven by receiving electric power (or current) to transmit the driving force to the gear connected to the motor. According to one embodiment, the motor may be implemented to provide a specified thrust (force) (e.g., a force of about 3 kgf) based on the repulsive force generated when the flexible display 460 slides in or out, and the motor may have a specified diameter (e.g., about 6.2 T or greater) to provide the specified force. According to one embodiment, the gear may be linked to the rack, based on the driving force from the motor such that the flexible display 460 slides in or out.

According to one embodiment, the sensor module 476 (e.g., the sensor module 176 of FIG. 1) may include at least one sensor. According to one embodiment, the at least one sensor may perform sensing to obtain a movement distance according to the movement of the first housing 201 (or at least a portion of the flexible display 460) to the slide-out state (an opened state) from the slide-in state (a closed state) with respect to the second housing 202 or vice versa. For example, the at least one sensor may include at least one hall sensor (e.g., the hall IC 320 of FIG. 3). According to one embodiment, the at least one hall sensor 320 may include a plurality of hall sensors 322 to 328, and the plurality of hall sensors 322 to 328 may be disposed at a predetermined interval in section ② in which the first housing 201 (or at least a portion of the flexible display 203) moves in a reciprocating motion. Each of the plurality of hall sensors 322 to 328 may detect the strength (or change in the magnetic field) of the magnetic field and may provide information (or data or a value) (e.g., hall IC Raw data (X-axis, Y-axis, and Z-axis data)) of the detected magnetic field strength to a processor 420. For example, the magnetic field generated by the magnet 310 of the first housing 201 may be detected by the plurality of hall sensors 322 to 328 according to the movement of the first housing 201 (or at least a portion of the flexible display 203) to the slide-out (an opened state) from the slide-in state (a closed state) with respect to the second housing 202, or vice versa. According to one embodiment, the processor 120 may identify (confirm or determinate or calculate) a distance (e.g., about several millimeters or centimeters) at which the first housing 201 (or at least a portion of the flexible display 203) is slid out from the second housing 202, based on the information of the magnetic field strength detected from each of the plurality of hall sensors 322 to 328. For example, the processor 420 may identify, in units of about 1 mm, a distance at which the first housing 201 (or at least a portion of the flexible display 460) is slid out from the second housing 202. According to one embodiment, as an example, the sensor module 476 includes a hall sensor, but the distance at which the first housing 201 (or at least a part of the flexible display 460) is slid out from the second housing 202 may also be identified by other known distance sensing methods.

According to one embodiment, The communication module 490 (e.g., the communication module 190 of FIG. 1), may communicate with the external electronic device 104 through a first network 198 (e.g., a short-range communication network such as Bluetooth, wireless fidelity (WiFi) direct, or infrared data association (IrDA)) or a second network 199 (e.g., a telecommunications network such as a legacy cellular network, a 5G network, a next-generation communication network (e.g., new radio access technology), the Internet, or a computer network (e.g., a LAN or WAN)), based on the control of at least one processor 420.

According to one embodiment, the at least one processor 420 (e.g., the processor 120 of FIG. 1) may control overall operations of the elements included in the electronic device 401.

According to one embodiment, the processor 420 may identify whether the state of the flexible display 460 is an expanded state (e.g., a partially expanded state or a fully expanded state) or a reduced state. According to one embodiment, the processor 420 according to one embodiment may identify (confirm or determine or calculate) a distance (e.g., about several millimeters or centimeters) at which the first housing 201 (or at least a portion of the flexible display 460) is slid out from the second housing 202, by using information received from the sensor module 476

(e.g., at least one hall sensor 320), and therefore, may identify whether the state of the flexible display 460 is an expanded state (e.g., a partially expanded state or a fully expanded state) or a reduced state. According to one embodiment, in the reduced state, the processor 420 may identify (or configure) the first edge area of the flexible display 460 disposed in the first direction (e.g., the fixing direction, the opposite direction to the expansion direction, or the reduction direction) from a center of the flexible display 460 as a first input area (e.g., an input area for receiving an expansion (or slide-out) request input). According to one embodiment the processor 420 may display, on at least a portion of the first input area, information (e.g., a GUI guide or an image) indicating that it is an expansion (or slide-out) request input area. For example, the display position, size, color, and/or type (text or image) of information indicating that it is an expansion (or slide-out) request input area may be designated by a user. According to one embodiment, the processor 420 may perform control such that the flexible display 460 enters an expanded state, based on reception of a first input (e.g., a multi-touch input, a multi-swipe input, a swipe input after a single long touch, or inputs through other designated input methods) to the first input area (or the GUI guide in the first input area) in the reduced state. In the expanded state, according to one embodiment, the processor 420 may identify (or configure) the second edge area in the second direction (e.g., the expansion direction) of the flexible display 460 as a second input area (e.g., a slide-in (or reduction) input). According to one embodiment, the processor 420 may display, on at least a portion of the second input area, information (e.g., a GUI guide or an image) indicating that it is a reduction (or slide-in) request input area. For example, the display position, size, color, and/or type (text or image) of information indicating that it is a reduction (or slide-in) request input area may be designated by a user. According to one embodiment, the processor 420 may perform control such that the flexible display 460 enters a reduced state, based on reception of a second input (e.g., a multi-touch input, a multi-touch swipe input, a swipe input after a single long touch, or inputs through other designated input methods) to the second input area (or the GUI guide in the second input area) in the expanded state.

According to one embodiment, the processor 420 may identify whether the state of the flexible display 460 is a reduced state, a partially expanded state, or a fully expanded state.

According to one embodiment, in the reduced state, the processor 420 may identify the first edge area of the flexible display 460 disposed in the first direction (e.g., the fixing direction, the opposite direction to the expansion direction, or the reduction direction) from a center of the flexible display 460 as a first input area (e.g., an input area for receiving an expansion (or slide-out) request input). According to one embodiment, The processor 420 may display, on at least a portion of the first input area, information (e.g., a GUI guide or an image) indicating that it is an expansion (or slide-out) request input area. For example, the display position, size, color, and/or type (text or image) of information indicating that it is an expansion (or slide-out) request input area may be designated by a user. According to one embodiment, the processor 420 may perform control such that the flexible display 460 enters a partially expanded state or the expanded state, based on reception of the first input through the first input area (or the GUI guide in the first input area) in the reduced state. According to one embodiment, the processor 420 may perform control such that the flexible display 460 enters a partially expanded state or an expanded state, based on the type of the first input (e.g., a first multi-touch input (e.g., three-finger touch input) or a second multi-touch input (e.g., two-finger touch input)) received through the first input area in the reduced state. For example, when the type of the first input received through the first input area in the reduced state is the first multi-touch input, the processor 420 may perform control such that the flexible display 460 enters a partially expanded state, and when the type of the first input received through the first input area in the reduced state is the second multi-touch input, the processor 420 may perform control such that the flexible display 460 enters a fully expanded state. According to one embodiment, when the first input is received through the first input area in the reduced state, the processor 420 may perform control such that the flexible display 460 enters a partially expanded state or the expanded state, based on the type of running application (e.g., a content playback application (e.g., a media player application)) or the type of running file (e.g., video file or photo file). For example, in case that the type of the running application is a content playback application when the first input is received through the first input area in the reduced state, the processor 420 may perform control such that the display enters a partially expanded state corresponding to the ratio of the content playback screen, and in case that the type of the running application is not a content playback application when the first input is received through the first input area in the reduced state, the processor 420 may perform control such that the display enters a fully expanded state. For example, in case that the type of the running file is a video file or a photo file when the first input is received through the first input area in the reduced state, the processor 420 may perform control such that the display enters a partially expanded state corresponding to the aspect ratio of the video or photo, and in case that the type of the running file is not a video file or a photo file when the first input is received through the first input area in the reduced state, the processor 420 may perform control such that the display enters a fully expanded state. According to one embodiment, when the first input is received through the first input area in the reduced state, the processor 420 may display information (e.g., a pop-up menu) for selecting a partially expanded state or a fully expanded state, and may perform control such that the flexible display 460 enters a partially expanded state or the fully expanded state, based on the partially expanded state or the fully expanded state selected by a user.

According to one embodiment, In the fully expanded state, the processor 420 may identify (or configure) the second edge area in the second direction (e.g., the expansion direction) of the flexible display 460 as a second input area (e.g., an input area for receiving reduction (or slide-in) request input). According to one embodiment, the processor 420 may display, on at least a portion of the second input area, information (e.g., a GUI guide or an image) indicating that it is a reduction (or slide-in) request input area. For example, the display position, size, color, and/or type (text or image) of information indicating that it is a reduction (or slide-in) request input area may be designated by a user. According to one embodiment, the processor 420 may perform control such that the flexible display 460 enters a partially expanded state or a reduced state, based on reception of the second input through the second input area (or the GUI guide in the second input area) in the fully expanded state. According to one embodiment, the processor 420 may perform control such that the flexible display 460 enters a partially expanded state or a reduced state, based on the type of the second input (e.g., a first multi-touch input (e.g., three-finger touch input) or a second multi-touch input (e.g., two-finger touch input)) received through the second input area in the fully expanded state. For example, when the type of the second input received through the second input area in the fully expanded state is the first multi-touch input, the processor 420 may perform control such that the flexible display 460 enters a partially expanded state, and when the type of the second input received through the second input area in the fully expanded state is the second multi-touch input, the processor 420 may perform control such that the flexible display 460 enters a reduced state. According to one embodiment, when the second input is received through the second input area in the fully expanded state, the processor 420 may perform control such that the flexible display 460 enters the partially expanded state or the reduced state, based on the type of running application (e.g., a content playback application (e.g., a media player application)) or the type of running file (e.g., video file or photo file). For example, in case that the type of the running application is a content playback application when the second input is received through the second input area in the fully expanded state, the processor 420 may perform control such that the display enters a partially expanded state corresponding to the ratio of the content playback screen, and in case that the type of the running application is not a content playback application when the second input is received through the second input area in the fully expanded state, the processor 420 may perform control such that the display enters a reduced state. For example, in case that the type of the running file is a video file or a photo file when the second input is received through the second input area in the fully expanded state, the processor 420 may perform control such that the display enters a partially expanded state corresponding to the aspect ratio of the video or photo, and in case that the type of the running file is not a video file or a photo file when the second input is received through the second input area in the fully expanded state, the processor 420 may perform control such that the display enters the reduced state. According to one embodiment, when the second input is received through the second input area in the fully expanded state, the processor 420 may display information (e.g., a pop-up menu) for selecting a partially expanded state or a reduced state, and may perform control such that the flexible display 460 enters the partially expanded state or the reduced state, based on the partially expanded state or the reduced state selected by a user.

According to one embodiment, in the partially expanded state, the processor 420 may identify (or configure) the first edge area of the flexible display 460 disposed in the first direction (e.g., the fixing direction, the opposite direction to the expansion direction, or the reduction direction) from a center of the flexible display 460 as a first input area (e.g., an input area for receiving a reduction (or slide-in) request input), and may identify (or configure) a second edge area in the second direction (e.g., the expansion direction) as a second input area (e.g., an input area for receiving a reduction (or slide-in) request input). According to one embodiment, the processor 420 may perform control such that the flexible display 460 enters a fully expanded state, based on reception of the first input through the first input area (or the GUI guide in the first input area) in the partially expanded state. According to one embodiment, the processor 420 according to one embodiment may perform control such that the flexible display 460 enters a reduced state, based on reception of the second input through the second input area (or the GUI guide in the second input area) in the partially expanded state.

According to one embodiment, the processor 420 may perform an operation by receiving the first input and/or the second input through the first input area and/or the second input area in a state in which the first edge area of the flexible display 460 disposed in the first direction (e.g., the fixing direction, the opposite direction to the expansion direction, or the reduction direction) from a center of the flexible display 460 is designated as the first input area (e.g., an input area for receiving a reduction (or slide-in) request input) and the second edge area in the second direction (e.g., the expansion direction) is designated as the second input area (e.g., reduction (e.g., an input area for receiving a reduction (or slide-in) request input) regardless of whether the current state of the electronic device 401 is the reduced state, a partially expanded state, and/or a fully expanded state.

According to one embodiment, the processor 420 may identify whether a display mode is a portrait view mode or a landscape view mode, identify the reduced state, the partially expanded state, and the fully expanded state in each of the landscape view mode and the portrait view mode, and perform an operation corresponding to each state.

According to one embodiment, in the reduced state, the processor 420 may identify a third edge area the flexible display 460 disposed in a bottom direction (a direction to a bottom sidewall) from a center of the flexible display 460 as a first input area (e.g., an input area for receiving an expansion (or slide-out) request input), and in the expanded state, the third edge area may be identified as a second input area (e.g., an input area for receiving a reduction (or slide-in) request input).

According to one embodiment, the memory 430 may store an application program and data. For example, the memory 430 may store an application (a function or a program) associated with a reduction, partial expansion, or full expansion operation, based on identification of an input (e.g., an expansion request input or an expansion request input) and the identification of an input area (e.g., a first input area or a second input area) in the reduced state, the partially expanded state, and/or the fully expanded state of the flexible display 460. According to one embodiment, the memory 430 according to one embodiment may store various data generated during execution of the program 140, including a program (e.g., the program 140 of FIG. 1) used for a functional operation. The memory 430 may largely include a program area 140 and a data area (not shown). The program area 140 may store related program information for driving the electronic device 401, such as an operating system (OS) (e.g., the operating system 142 of FIG. 1) for booting the electronic device 401. The data area (not shown) may store transmitted and/or received data and generated data according to various embodiments. In addition, the memory 430 may be configured to include at least one storage medium of a flash memory, a hard disk, a multimedia card micro-type memory (e.g., a secure digital (SD) or extreme digital (XD) memory), RAM, and ROM.

According to one embodiment, the electronic device 401 is not limited to the configuration shown in FIG. 4 and may further include various elements. According to one embodiment, the electronic device 401 may further include an image processing module (not shown). The image processing module may perform 2D or 3D image processing and/or rendering operation, based on the control of the processor 420.

In the above-described embodiment, the main elements of the electronic device have been described through the electronic device 401 of FIG. 4. However, in various embodiments, not all of the elements shown in FIG. 4 are essential elements, and the electronic device 401 may be implemented by more elements than the illustrated elements, or the electronic device 401 may be implemented by fewer elements than the illustrated elements.

According to various embodiments, the electronic device (e.g., the electronic device 101 of FIG. 1 or the electronic device 401 of FIG. 4) may include a first housing (e.g., the first housing 201 of FIG. 2B), a second housing (e.g., the second housing 202 of FIG. 2B) configured to accommodate at least a portion of the first housing and connected to the first housing to enable sliding of the first housing, a flexible display (e.g., the display 160 of FIG. 1, the flexible display 203 of FIG. 2B, or the flexible display 460 of FIG. 4) connected to the first housing, a slide driving unit (e.g., the slide driving unit 465 of FIG. 4) configured to slidingly move the first housing and the flexible display in an expansion direction or a reduction direction, and at least one processor (e.g., the processor 120 of FIG. 1 or the processor 420 of FIG. 4), and the at least one processor may be configured to identify a reduced state in which the flexible display is slid in the reduction direction or an expanded state in which the flexible display is slid in the expansion direction, in the reduced state, identify a first edge area of the flexible display disposed in the reduction direction from a center of the flexible display as a first input area and control the slide driving unit such that the flexible display enters the expanded state, based on reception of a first input through the first input area, and in the expanded state, identify a second edge area of the flexible display disposed in the expansion direction from the center of the flexible display as a second input area and control the slide driving unit such that the flexible display enters the reduced state, based on reception of a second input through the second input area.

According to various embodiments, the electronic device may further include a magnet (e.g., the magnet 310 of FIG. 3) disposed in the first housing, and at least one hall sensor (e.g., at least one hall sensor 320 of FIG. 3) disposed in the second housing to sense a magnetic field generated by the magnet, and the at least one processor may be configured to identify, by using the at least one hall sensor, a distance at which the flexible display is slid in the reduction direction or the expansion direction.

According to various embodiments, each of the first input and the second input may include one of a swipe input after single long touch, a multi-swipe input, or a multi-touch input.

According to various embodiments, the at least one processor may be configured to display, on at least a portion of the first edge area, first information indicating that the first edge area is an expansion request input area or display, on at least a portion of the second edge area, second information indicating that the second edge area is a reduction request input area.

According to various embodiments, the at least one processor may be configured to designate a display position, size, color, or type of the first information or the second information, based on a user input.

According to various embodiments, the at least one processor may be configured to identify whether the expanded state is a partially expanded state or a fully expanded state.

According to various embodiments, the at least one processor may be configured to, when the first input is received through the first input area in the reduced state, identify whether the first input is a partial expansion request input or a full expansion request input, based on a designated condition, control the slide driving unit such that the flexible display enters a partially expanded state, based on identification of the partial expansion request input, and control the slide driving unit such that the flexible display enters a fully expanded state, based on identification of the full expansion request input.

According to various embodiments, the designated condition may include one of a type of the first input, a type of an application to be executed upon the first input, a type of a file to be executed upon the first input, or a user selection input using a pop-up menu.

According to various embodiments, the at least one processor may be configured to, when the second input is received through the second input area in the expanded state, identify whether the second input is a partial expansion request input or a reduction request input, based on a designated condition, control the slide driving unit such that the flexible display enters a partially expanded state, based on identification of the partial expansion request input, and control the slide driving unit such that the flexible display enters a reduced state, based on identification of the reduction request input.

According to various embodiments, the at least one processor may be configured to, in the reduced state, identify a third edge area of the flexible display disposed in the bottom direction from a center of the electronic device as the first input area, and in the expanded state, identify the third edge area as the second input area.

According to an embodiment of the disclosure, the electronic device (e.g., the electronic device 101 of FIG. 1 or the electronic device 401 of FIG. 4) includes: (e.g., the first housing 201 of FIG. 2B); a second housing (e.g., the second housing 202 of FIG. 2B) configured to accommodate at least a portion of the first housing and including an open side through which the first housing is slidable; a flexible display (e.g., the display 160 of FIG. 1, the flexible display 203 of FIG. 2B, or the flexible display 460 of FIG. 4) connected to the first housing; a slide driving unit (e.g., the slide driving unit 465 of FIG. 4) configured to slidingly move the first housing and the flexible display in an expansion direction or a reduction direction opposite the expansion direction; and at least one processor (e.g., the processor 120 of FIG. 1 or the processor 420 of FIG. 4). and the at least one processor is configured to identify a reduced state in which the flexible display is slid in the reduction direction or an expanded state in which the flexible display is slid in the expansion direction, in the reduced state, identify a first edge area of the flexible display corresponding to a sidewall of the second housing as a first input area and control the slide driving unit such that the flexible display enters the expanded state, based on reception of a first input through the first input area, and in the expanded state, identify a second edge area of the flexible display corresponding to an outermost sidewall of the first housing as a second input area and control the slide driving unit such that the flexible display enters the reduced state, based on reception of a second input through the second input area. The sidewall of the second housing is disposed opposite to the open side, and the outermost sidewall of the first housing is disposed opposite to the sidewall of the second housing.

Figure 5:
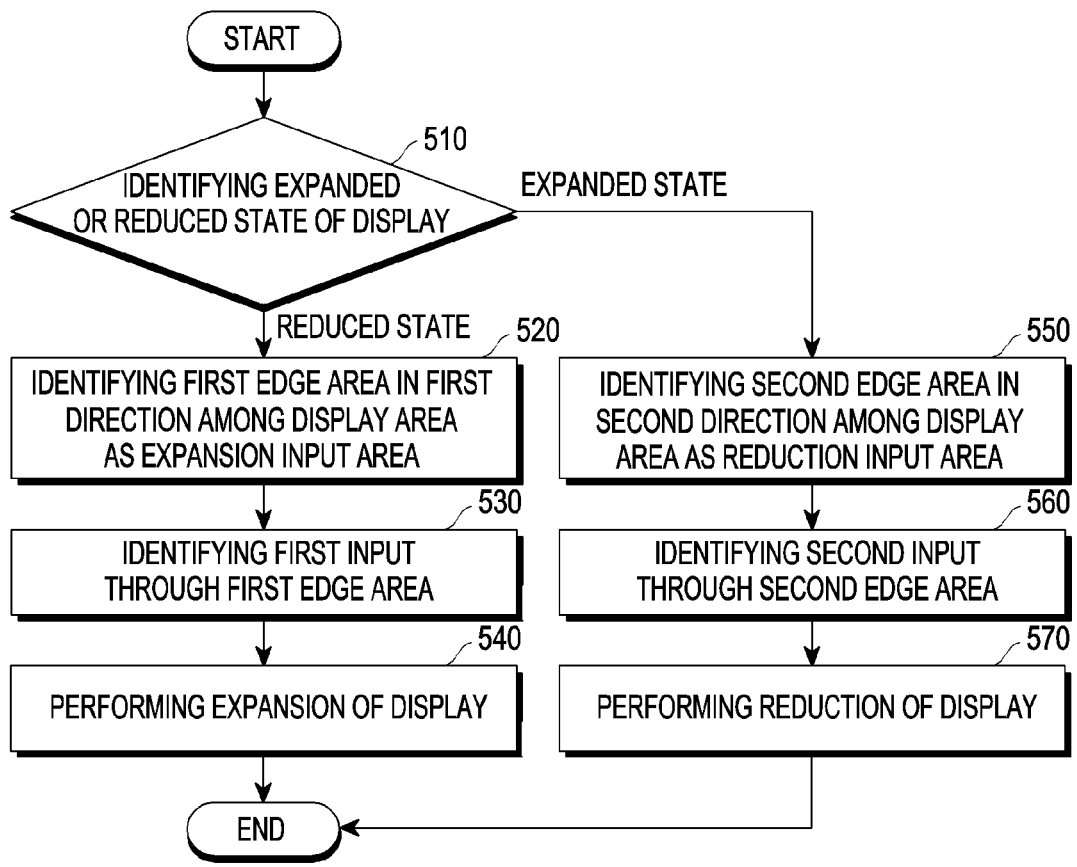
FIG. 5 is a flowchart illustrating an input area control operation for expanding and reducing a display in an electronic device including a flexible display according to one embodiment.

FIG. 5 is a flowchart showing an input area control operation for expanding and reducing a display in an electronic device including a flexible display according to one embodiment.

Referring to FIG. 5, the processor (e.g., the processor 120 of FIG. 1 or the processor 420 of FIG. 4) of the electronic device (e.g., the electronic device 101 of FIG. 1 or the electronic device 401 of FIG. 4) according to one embodiment may perform operations 510 to 570.

In operation 510, according to one embodiment, the processor 420 may identify whether the state of the flexible display 460 is an expanded state (e.g., a partially expanded state or a fully expanded state) or a reduced state. According to one embodiment, the processor 420 may identify (confirm, determine, or calculate) a distance (e.g., about several millimeters or centimeters) at which the first housing 201 (or at least a portion of the flexible display 460) is slid out from the second housing 202, by using information received from the sensor module 476 (e.g., the at least one hall sensor 320), and therefore, may identify whether the state of the flexible display 460 is an expanded state (e.g., a partially expanded state or a fully expanded state) or a reduced state.

In operation 520, according to one embodiment, in the reduced state, the processor 420 may configure the first edge area of the flexible display 460 disposed in the first direction (e.g., the fixing direction, the opposite direction to the expansion direction, or the reduction direction) from a center of the flexible display 460 as a first input area (e.g., an input area for receiving an expansion (or slide-out) request input). According to one embodiment, the processor 420 may display, on at least a portion of the first input area, information (e.g., a GUI guide or an image) indicating that it is an expansion (or slide-out) request input area. For example, the display position, size, color, and/or type (text or image) which are indicating that it is an expansion (or slide-out) request input area may be designated by a user.

In operation 530, according to one embodiment, the processor 420 may identify reception of a first input (e.g., a multi-touch input, a multi-swipe input, a swipe input after a single long touch, or inputs through other designated input methods) to the first input area (or a GUI guide in the first input area) in the reduced state.

In operation 540, according to one embodiment, the processor 420 may perform expansion of a display. The processor 420 according to one embodiment may control the slide driving unit 465 such that the flexible display 460 enters an expanded state, based on identification (reception) of the first input in the first input area in the reduced state.

In operation 550, in the expanded state, according to one embodiment, the processor 420 may configure the second edge area in the second direction (e.g., the expansion direction) of the flexible display 460 as a second input area (e.g., an input area for receiving a slide-in (or reduction) input). According to one embodiment, the processor 420 according to one embodiment may display, on at least a portion of the second input area, information (e.g., a GUI guide or an image) indicating that it is a reduction (or slide-in) request input area. For example, the display position, size, color, and/or type (text or image), which are indicating that it is a reduction (or slide-in) request input area, may be designated by a user.

In operation 560, according to one embodiment, the processor 420 may identify reception of a second input (e.g., a multi-touch input, a multi-swipe input, a swipe input after a single long touch, or inputs through other designated input methods) to the second input area (or a GUI guide in the second input area) in the expanded state.

In operation 570, according to one embodiment, the processor 420 may perform reduction of a display. According to one embodiment, The processor 420 may control the slide driving unit 465 such that the flexible display 460 enters a reduced state, based on identification (reception) of the second input in the second input area.

According to various embodiments, a method for controlling an input area for expansion or reduction of a display in the electronic device (e.g., the electronic device 101 of FIG. 1 or the electronic device 401 of FIG. 4) may include identifying a reduced state in which the flexible display (e.g., the display 160 of FIG. 1 or the flexible display 460 of FIG. 4) is slid in the reduction direction or an expanded state in which the flexible display is slid in the expansion direction, in the reduced state, configuring a first edge area of the flexible display disposed in the reduction direction from a center of the flexible display as a first input area and performing control such that the flexible display enters the expanded state, based on reception of a first input through the first input area, and in the expanded state, configuring a second edge area of the flexible display disposed in the expansion direction from the center of the flexible display as a second input area and performing control such that the flexible display enters the reduced state, based on reception of a second input through the second input area.

According to various embodiments, the method may include identifying a distance at which the flexible display is slid in the reduction direction or the expansion direction, by using a magnet (e.g., the magnet 310 of FIG. 3) disposed in the first housing (e.g. the first housing 201 of FIGS. 2A and 2B) of the electronic device, and at least one hall sensor (e.g., at least one hall sensor 320 of FIG. 3) disposed in the second housing (e.g. the second housing 202 of FIGS. 2A and 2B) of the electronic device to sense a magnetic field generated by the magnet.

According to various embodiments, each of the first input and the second input may include one of a swipe input after single long touch, a multi-swipe input, or a multi-touch input.

According to various embodiments, the method may further include displaying, on at least a portion of the first edge area, first information indicating that the first edge area is an expansion request input area or displaying, on at least a portion of the second edge area, second information indicating that the second edge area is a reduction request input area.

According to various embodiments, the method may further include designating a display position, size, color, or type of the first information or the second information, based on a user input.

According to various embodiments, the method may further include identifying whether the expanded state is a partially expanded state or a fully expanded state.

According to various embodiments, the method may further include, when the first input is received through the first input area in the reduced state, identifying whether the first input is a partial expansion request input or a full expansion request input, based on a designated condition, and performing control such that the flexible display enters a partially expanded state, based on identification of the partial expansion request input or performing control such that the flexible display enters a fully expanded state, based on identification of the full expansion request input.

According to various embodiments, the designated condition may include one of a type of the first input, a type of an application to be executed upon the first input, a type of a file to be executed upon the first input, or a user selection input using a pop-up menu.

According to various embodiments, the method may further include, in the reduced state, identifying a third edge area of the flexible display disposed in the bottom direction from a center of the electronic device as the first input area, and in the expanded state, identifying the third edge area as the second input area.

Figure 6A:
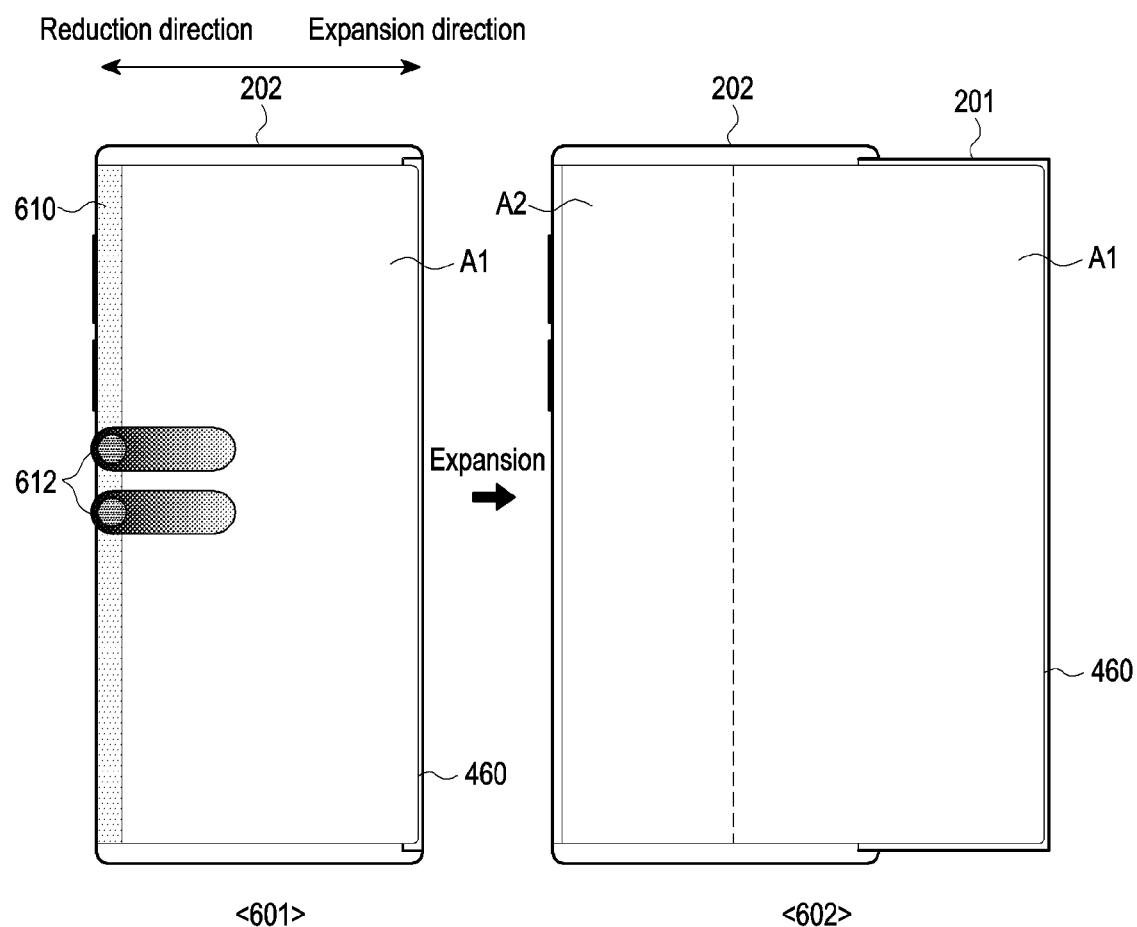
FIG. 6A illustrates an example in which an electronic device transitions to an expanded state from a reduced state according to one embodiment.
Figure 6B:
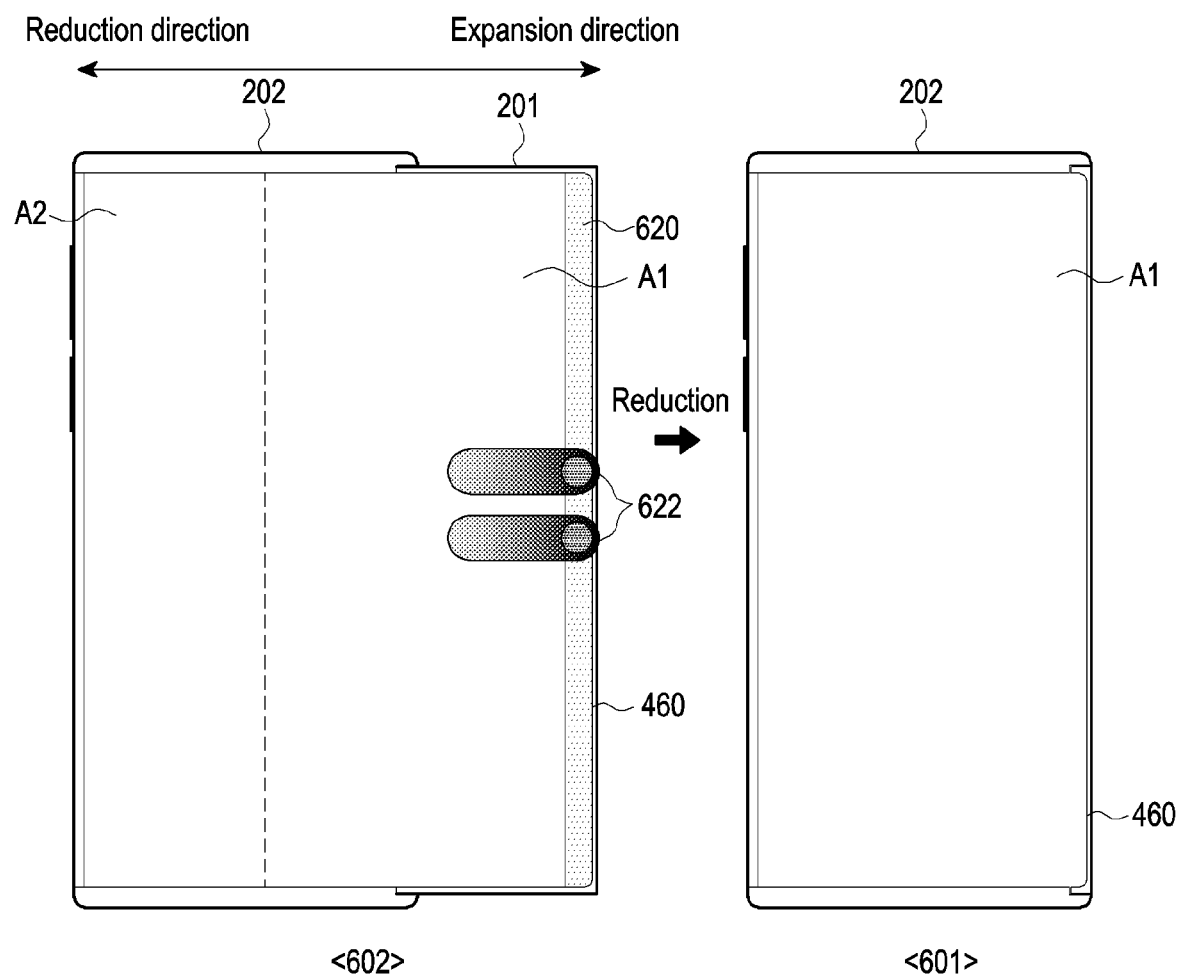
FIG. 6B illustrates an example in which an electronic device transitions to a reduced state from an expanded state according to one embodiment.

FIG. 6A illustrates an example in which an electronic device transitions to an expanded state from a reduced state according to one embodiment. FIG. 6B illustrates an example in which an electronic device transitions to a reduced state from an expanded state according to one embodiment.

Referring to FIG. 6A, according to one embodiment, the processor 420 may display a first display area A1 in the reduced state <601>, and may configure a first edge area 610 of the flexible display 460 disposed in the first direction (e.g., the fixing direction, the opposite direction to the expansion direction, or the reduction direction) from a center of the flexible display 460 among the first display area A1 as a first input area (e.g., an input area for receiving an expansion (or slide-out) request input). According to one embodiment, the processor 420 may control the slide driving unit 465 such that the flexible display 460 moves in the expansion direction (slide-out direction) with respect to the second housing 202, based on a first input 612 (e.g., a multi-touch swipe input in the expansion direction) to the first input area 610. When the flexible display 460 is moved the maximum movable distance in the expansion direction (slide-out direction) with respect to the second housing 202, the flexible display 460 may be in a fully expanded state <602>, and when the flexible display 460 is moved less than the maximum movable distance in the expansion direction (slide-out direction) with respect to the second housing 202, the flexible display 460 may be in a partially expanded state. In the fully expanded state <602>, at least a portion (e.g., A2) of the flexible display 460 may be exposed to the front face of the electronic device, and thus the display area may be expanded.

Referring to FIG. 6B, according to one embodiment, the processor 420 may perform display by using the first display area A1 and the expanded display area A2 in the expanded state (fully expanded state) <602>, and may configure the second edge area 620 in the second direction (e.g., the expansion direction) of the flexible display 460 as a second input area (e.g., an input area for receiving a reduction (or slide-in) request input). According to one embodiment, the processor 420 according to one embodiment may control the slide driving unit 465 such that the flexible display 460 moves in the reduction direction (slide-in direction) with respect to the second housing 202, based on the second input 622 (e.g., a multi-touch swipe input in the reduction direction) to the second input area 620. When the flexible display 460 is moved the maximum movable distance in the reduction direction (slide-in direction) with respect to the second housing 202, the display may be in a reduced state <601>, and when the flexible display 460 is moved less than the maximum movable distance in the reduction direction (slide-in direction) with respect to the second housing 202, the flexible display 460 may be in a partially expanded state. In the reduced state <601>, at least a portion (e.g., A2) of the flexible display 460 may not be exposed to the front face of the electronic device, and thus the display area may be reduced.

Figure 7A:
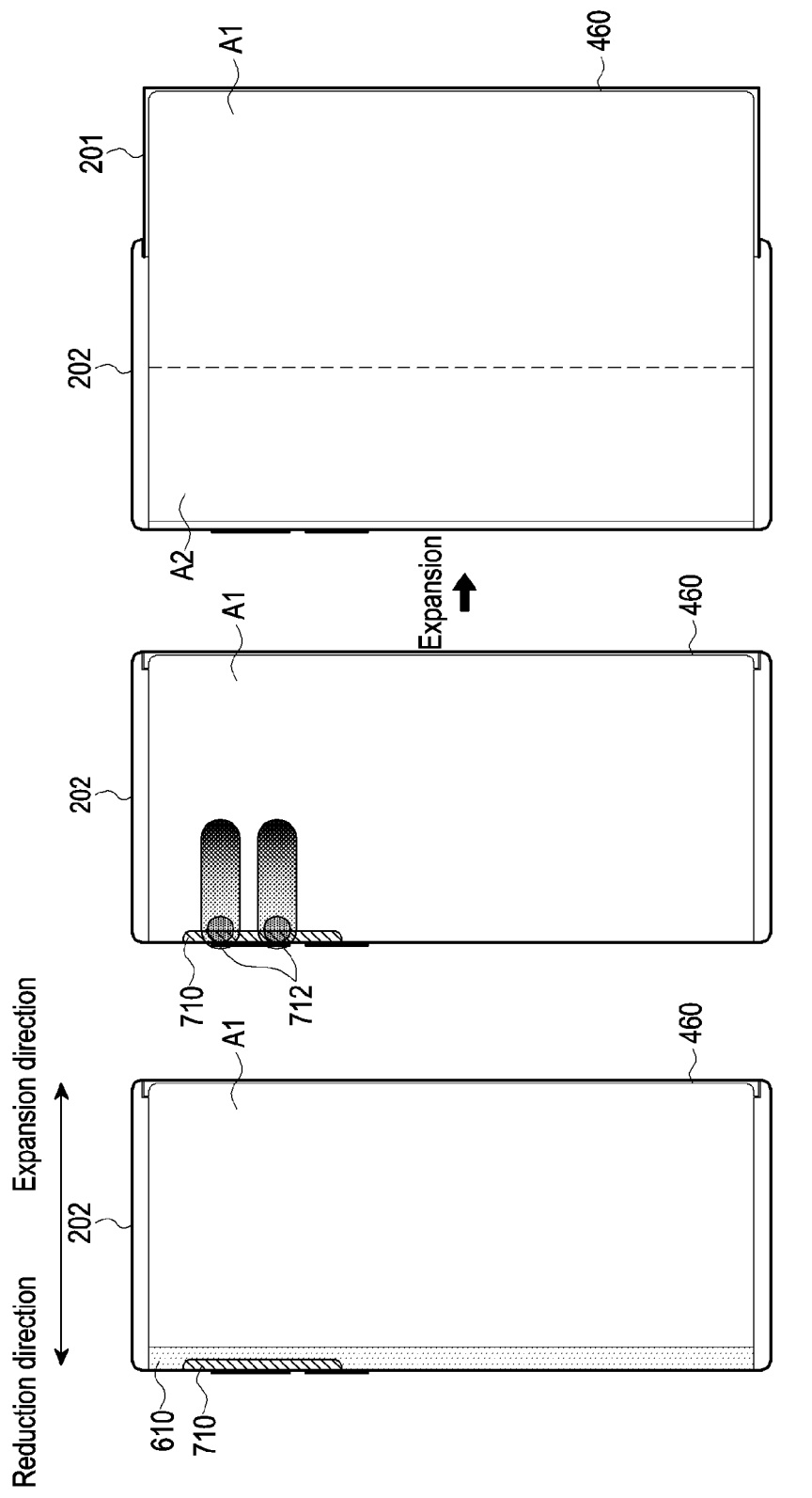
FIG. 7A illustrates GUI guide information displayed in a first input area in a reduced state of an electronic device according to one embodiment.
Figure 7B:
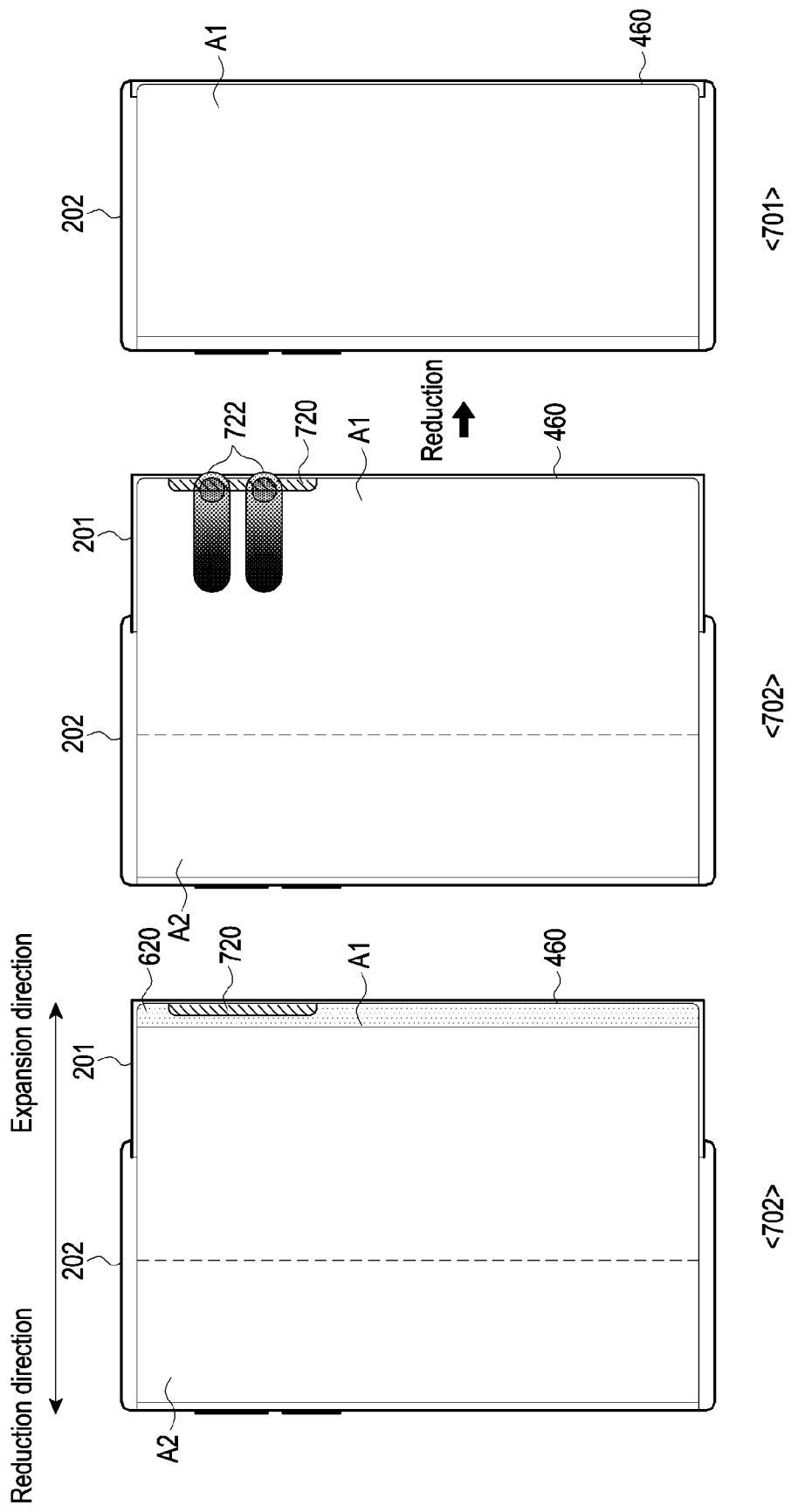
FIG. 7B illustrates GUI guide information displayed in a second input area in an expanded state of an electronic device according to one embodiment.

FIG. 7A illustrates GUI guide information displayed in a first input area in a reduced state of an electronic device according to one embodiment. FIG. 7B illustrates GUI guide information displayed in a second input area in an expanded state of an electronic device according to one embodiment.

Referring to FIG. 7A, according to one embodiment, the processor 420 may display the first display area A1 in the reduced state <701>, and in a state in which the first edge area of the flexible display 460 disposed in the first direction (e.g., the fixing direction, the opposite direction to the expansion direction, or the reduction direction) from a center of the flexible display 460 among the first display area A1 is configured as the first input area 610 (e.g., an input area for receiving an expansion (or slide-out) request input), may display, on at least a portion of the first input area, information (e.g., a GUI guide or an image) 710 indicating that it is an expansion (or slide-out) request input area. For example, the display position, size, color, and/or type (text or image) of information indicating that it is an expansion (or slide-out) request input area may be designated by a user. For example, the GUI guide 710 (e.g., an edge panel handle) may be displayed using at least a partial area of the first edge area 610 of the electronic device, and the position of at least the partial area on the first edge area 610 in which the edge panel handle is displayed may be changeable. According to one embodiment, The processor 420 may control the slide driving unit 465 such that the flexible display 460 moves in the expansion direction (slide-out direction) with respect to the second housing 202, based on the first input 712 (e.g., a multi-touch swipe input in the expansion direction) to the GUI guide 710. When the flexible display 460 is moved the maximum movable distance in the expansion direction (slide-out direction) with respect to the second housing 202, the flexible display 460 may be in a fully expanded state <702>, and when the flexible display 460 is moved less than the maximum movable distance in the expansion direction (slide-out direction) with respect to the second housing 202, the flexible display 460 may be in a partially expanded state. In the fully expanded state <702>, at least a portion (e.g., A2) of the flexible display 460 may be exposed to the front face of the electronic device, and thus the display area may be expanded.

Referring to FIG. 7B, in a state in which the second edge area in the second direction (e.g., the expansion direction) of the flexible display 460 is identified as the second input area 620 (e.g., an input area for receiving a reduction (or slide-in) request input) in the expanded state (the fully expanded state) <702>, the processor 420 according to one embodiment may display, on at least a portion of the second input area 620, information (e.g., a GUI guide or an image) 720 indicating that it is a reduction (or slide-in) request input area. For example, the GUI guide 720 (e.g., an edge panel handle) may be displayed using at least a partial area of the second edge area 620 of the electronic device, and the position of at least the partial area on the second edge area 620 in which the edge panel handle is displayed may be changeable. For example, the display position, size, color, and/or type (text or image) of information indicating that it is a reduction (or slide-in) request input area may be designated by a user. According to one embodiment, the processor 420 according to one embodiment may control the slide driving unit 465 such that the flexible display 460 moves in the reduction direction (slide-in direction) with respect to the second housing 202, based on the second input 722 (e.g., a multi-touch swipe input in the reduction direction) to the GUI guide 720. When the flexible display 460 is moved the maximum movable distance in the reduction direction (slide-in direction) with respect to the second housing 202, the flexible display 460 may be in a reduced state <701>, and when the flexible display 460 is moved less than the maximum movable distance in the reduction direction (slide-in direction) with respect to the second housing 202, the flexible display 460 may be in a partially expanded state. In the reduced state <701>, at least a portion (e.g., A2)

of the flexible display 460 may not be exposed to the front face of the electronic device, and thus the display area may be reduced.

Figure 8A:
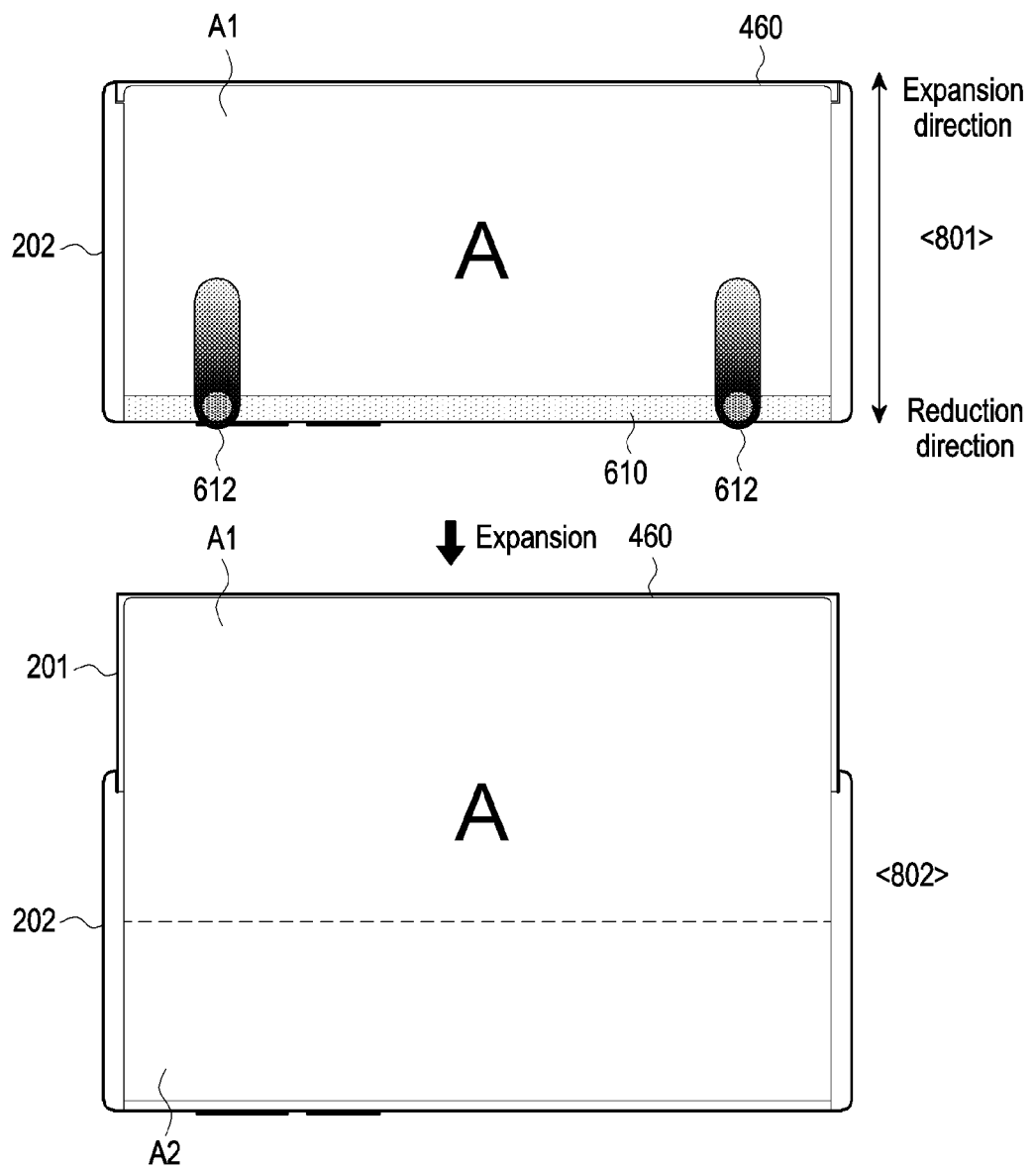
FIG. 8A illustrates an example in which an electronic device transitions to an expanded state from a reduced state when the electronic device is in a landscape view mode, according to one embodiment.
Figure 8B:
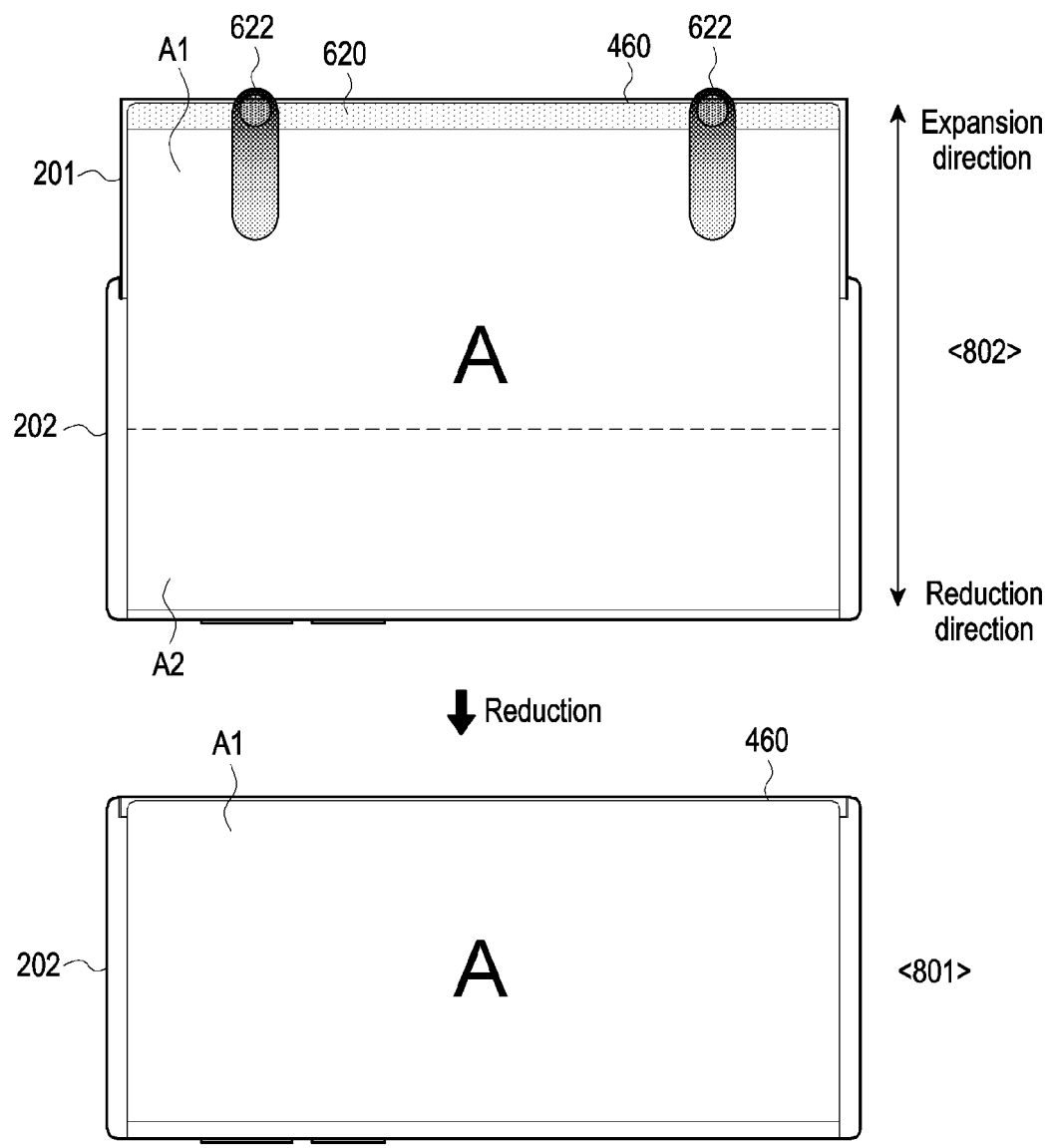
FIG. 8B illustrates an example in which an electronic device transitions to a reduced state from an expanded state when the electronic device is in a landscape view mode, according to one embodiment.

FIG. 8A illustrates an example in which an electronic device transitions to an expanded state from a reduced state when the electronic device is in a landscape view mode, according to one embodiment. FIG. 8B illustrates an example in which an electronic device transitions to a reduced state from an expanded state when the electronic device is in a landscape view mode, according to one embodiment.

Referring to FIG. 8A, according to one embodiment, the processor 420 may display the horizontal screen (A) on the first display area A1 while being in the landscape view mode and in the reduced state <801>, and may identify a first edge area of the flexible display 460 disposed in the first direction (e.g., the fixing direction, the opposite direction to the expansion direction, or the reduction direction) from a center of the flexible display 460 among the first display area A1 as the first input area 610 (e.g., an input area for receiving an expansion (or slide-out) request input). According to one embodiment, the processor 420 may control the slide driving unit 465 such that the flexible display 460 moves in the expansion direction (slide-out direction) with respect to the second housing 202, based on the first input 612 (e.g., a multi-touch swipe input in the expansion direction) to the first input area 610. When the flexible display 460 is moved the maximum movable distance in the expansion direction (slide-out direction) with respect to the second housing 202, the flexible display 460 may be in a fully expanded state <802>, and when the flexible display 460 is moved less than the maximum movable distance in the expansion direction (slide-out direction) with respect to the second housing 202, the flexible display 460 may be in a partially expanded state. In the fully expanded state <802>, at least a portion (e.g., A2) of the flexible display 460 may be exposed to the front face of the electronic device, and thus the landscape view display area may be expanded.

Referring to FIG. 8B, according to one embodiment, the processor 420 may perform display by using the first display area A1 and the expanded display area A2 while being in the landscape view mode and in the expanded state (the fully expanded state) <802>, and may identify the second edge area in the second direction (e.g., the expansion direction) of the flexible display 460 as the second input area 620 (e.g., an input area for receiving a reduction (or slide-in) request input). According to one embodiment, the processor 420 according to one embodiment may control the slide driving unit 465 such that the flexible display 460 moves in the reduction direction (slide-in direction) with respect to the second housing 202, based on the second input 622 (e.g., a multi-touch swipe input in the reduction direction) to the second input area 620. When the flexible display 460 is moved the maximum movable distance in the reduction direction (slide-in direction) with respect to the second housing 202, the flexible display 460 may be in a reduced state <801>, and when the flexible display 460 is moved less than the maximum movable distance in the reduction direction (slide-in direction) with respect to the second housing 202, the flexible display 460 may be in a partially expanded state. In the reduced state <801>, at least a portion (e.g., A2) of the flexible display 460 may not be exposed to the front face of the electronic device, and thus the landscape view display area may be reduced.

Figure 9:
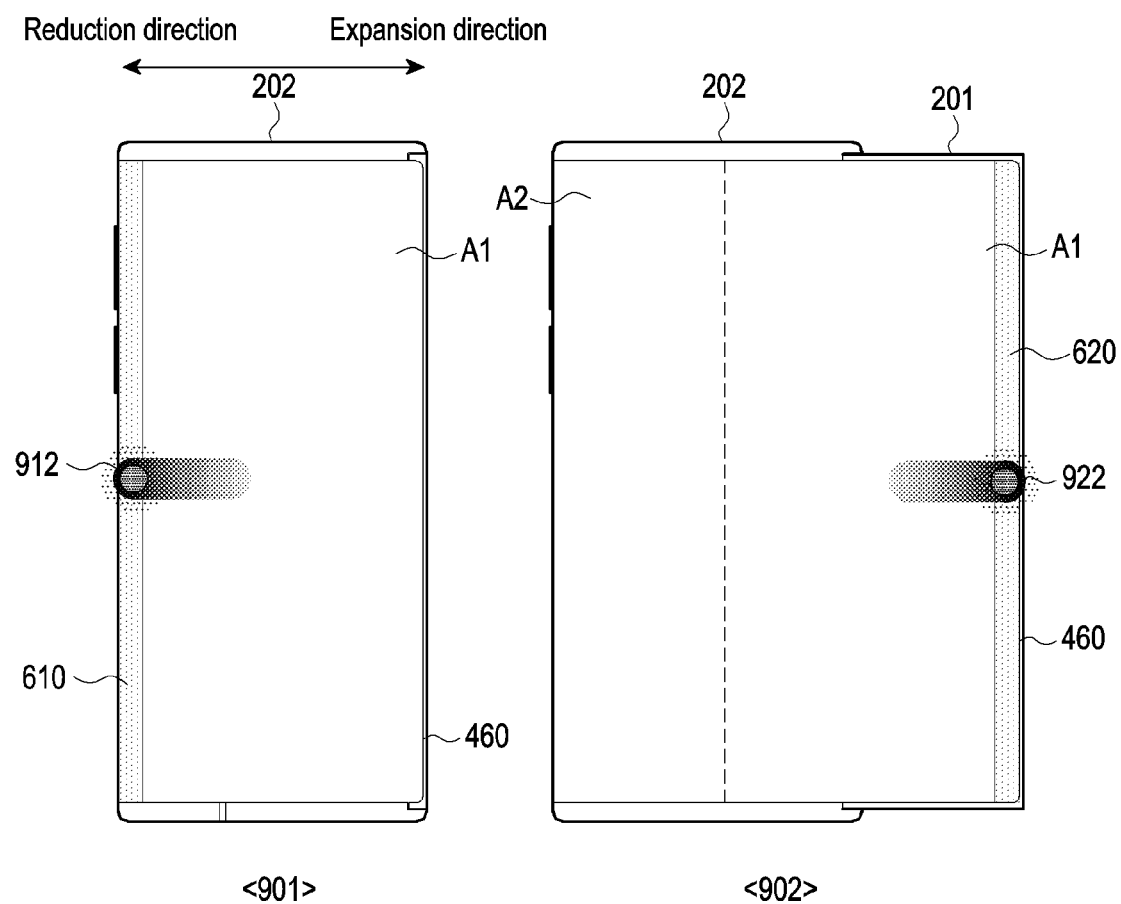
FIG. 9 illustrates an example in which a first input or a second input designated to be identified in a first input area or a second input area of an electronic device is a swipe input after a long touch, according to one embodiment.

FIG. 9 illustrates an example in which a first input or a second input designated to be identified in a first input area or a second input area of an electronic device is a swipe input after a long touch, according to one embodiment.

Referring to FIG. 9, when a swipe input after a long touch is received as the first input 912 in the first input area 610 in the reduced state <901>, the processor 420 according to one embodiment may control the slide driving unit 465 such that the flexible display 460 moves in the expansion direction (slide-out direction) with respect to the second housing 202. When a swipe input after a long touch is received as the second input 922 in the second input area 620 in the expanded state <902>, according to one embodiment the processor 420 may control the slide driving unit 465 such that the flexible display 460 moves in the reduction direction (slide-in direction) with respect to the second housing 202.

Figure 10:
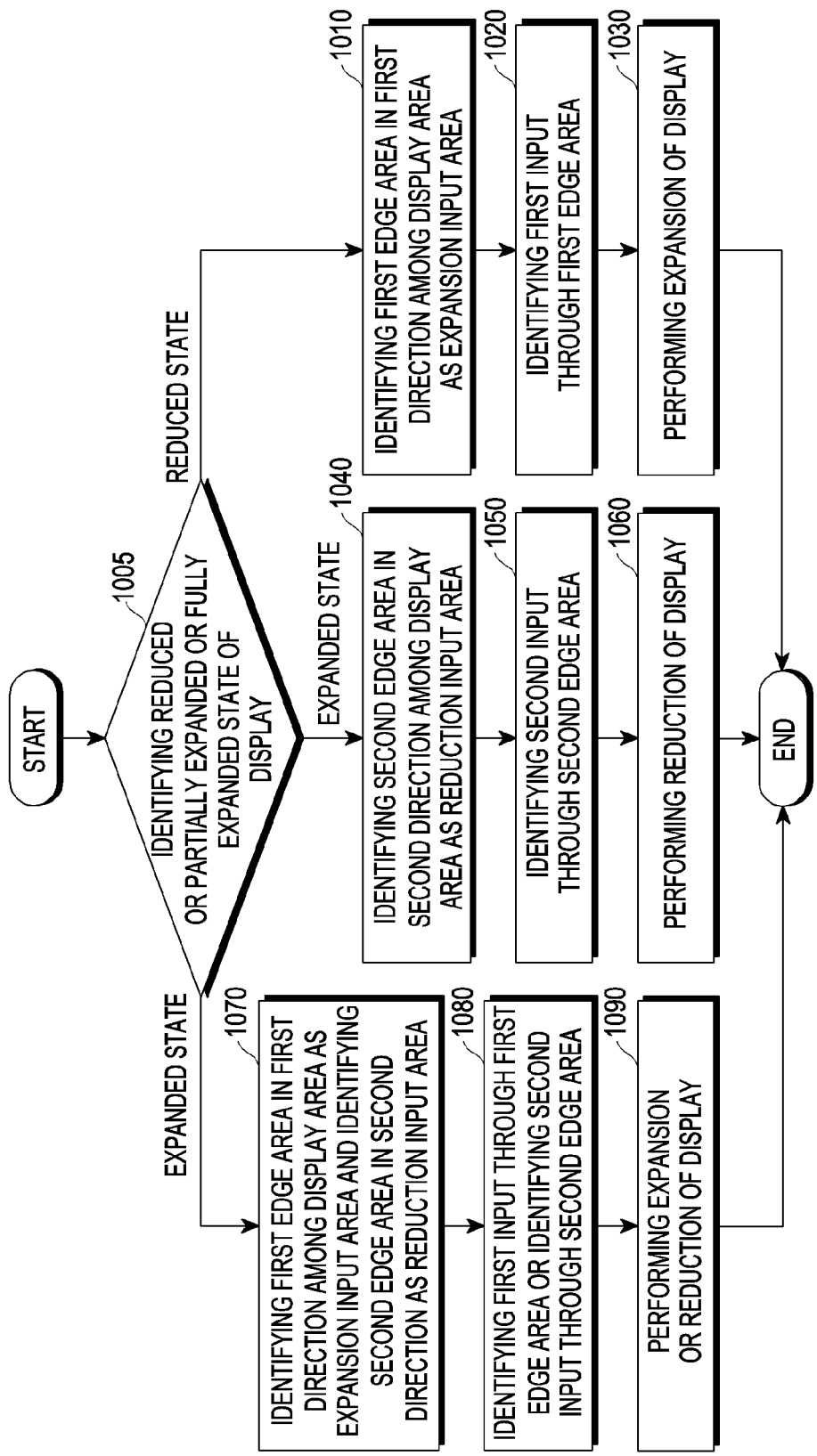
FIG. 10 is a flowchart showing an input area control operation for full expansion, partial expansion, and reduction of a display in an electronic device according to one embodiment.

FIG. 10 is a flowchart showing an input area control operation for full expansion, partial expansion, and reduction of a display in an electronic device according to one embodiment.

Referring to FIG. 10, according to one embodiment, the processor (e.g., the processor 120 of FIG. 1 or the processor 420 of FIG. 4) of the electronic device (e.g., the electronic device 101 of FIG. 1 or the electronic device 401 of FIG. 4) may perform at least one of operations 1005 to 1090.

In operation 1005, according to one embodiment, the processor 420 may identify whether the state of the flexible display 460 is a reduced state, a partially expanded state, or a fully expanded state. According to one embodiment, the processor 420 may identify (confirm or determine or calculate) a distance (e.g., about several millimeters or centimeters) at which the first housing 201 (or at least a portion of the flexible display 460) is slid out from the second housing 202, by using information received from the sensor module 476 (e.g., at least one hall sensor 320), and therefore, may identify whether the state of the flexible display 460 is a reduced state, a partially expanded state, or a fully expanded state.

In operation 1010, according to one embodiment, the processor 420 may identify, in the reduced state, the first edge area in a first direction (e.g., the fixing direction, the opposite direction to the expansion direction, or the reduction direction) of the flexible display 460 as a first input area (e.g., an input area for receiving an expansion (or slide-out) request input). According to one embodiment, the processor 420 may display, on at least a portion of the first input area, information (e.g., a GUI guide or an image), indicating that it is an expansion (or slide-out) request input area. For example, the display position, size, color, and/or type (text or image) of information indicating that it is an expansion (or slide-out) request input area may be designated by a user.

In operation 1020, according to one embodiment, the processor 420 may identify (or receive) a first input through the first input area (or a GUI guide in the first input area) in the reduced state.

In operation 1030, according to one embodiment, the processor 420 may perform control such that the flexible display 460 enters an expanded state (a partially expanded state or a fully expanded state), based on identification of the first input through the first input area in the reduced state. According to one embodiment, the processor 420 may perform control such that the flexible display 460 enters a partially expanded state or an expanded state, based on the type of the first input (e.g., a first multi-touch input (e.g., three-finger touch input) or a second multi-touch input (e.g., two-finger touch input)) received through the first input area in the reduced state. For example, when the type of the first input received through the first input area in the reduced state is the first multi-touch input, the processor 420 may perform control such that the flexible display 460 enters a partially expanded state, and when the type of the first input received through the first input area in the reduced state is the second multi-touch input, the processor 420 may perform control such that the flexible display 460 enters a fully expanded state. According to one embodiment, when the first input is received through the first input area in the reduced state, the processor 420 may perform control such that the flexible display 460 enters a partially expanded state or the expanded state, based on the type of running application (e.g., a content playback application (e.g., a media player application)) or the type of running file (e.g., video file or photo file). For example, in case that the type of the running application is a content playback application when the first input is received through the first input area in the reduced state, the processor 420 may perform control such that the display enters a partially expanded state corresponding to the ratio of the content playback screen, and in case that the type of the running application is not a content playback application when the first input is received through the first input area in the reduced state, the processor 420 may perform control such that the display enters a fully expanded state. For example, in case that the type of the running file is a video file or a photo file when the first input is received through the first input area in the reduced state, the processor 420 may perform control such that the display enters a partially expanded state corresponding to the aspect ratio of the video or photo, and in case that the type of the running file is not a video file or a photo file when the first input is received through the first input area in the reduced state, the processor 420 may perform control such that the display enters a fully expanded state. According to one embodiment, when the first input is received through the first input area in the reduced state, the processor 420 may display information (e.g., a pop-up menu) for selecting a partially expanded state or a fully expanded state, and may perform control such that the flexible display 460 enters a partially expanded state or the fully expanded state, based on the partially expanded state or the fully expanded state selected by a user.

In operation 1040, according to one embodiment, in the fully expanded state, the processor 420 may identify the second edge area in the second direction (e.g., the expansion direction) of the flexible display 460 as a second input area (e.g., an input area for receiving reduction (or slide-in) request input). According to one embodiment, the processor 420 may display, on at least a portion of the second input area, information (e.g., a GUI guide or an image) indicating that it is a reduction (or slide-in) request input area. For example, the display position, size, color, and/or type (text or image) of information indicating that it is a reduction (or slide-in) request input area may be designated by a user.

In operation 1050, according to one embodiment, the processor 420 may identify (or receive) the second input through the second input area (or a GUI guide in the second input area) in the fully expanded state.

In operation 1060, according to one embodiment, the processor 420 according to one embodiment may perform control such that the flexible display 460 is reduced (a partially expanded state or a reduced state), based on reception of the second input through the second input area in the fully expanded state. According to one embodiment, the processor 420 may perform control such that the flexible display 460 enters a partially expanded state or a reduced state, based on the type of the second input (e.g., a first multi-touch input (e.g., three-finger touch input) or a second multi-touch input (e.g., two-finger touch input)) received through the second input area in the fully expanded state. For example, when the type of the second input received through the second input area in the fully expanded state is the first multi-touch input, the processor 420 may perform control such that the flexible display 460 enters a partially expanded state, and when the type of the second input received through the second input area in the fully expanded state is the second multi-touch input, the processor 420 may perform control such that the flexible display 460 enters a reduced state. According to one embodiment, when the second input is received through the second input area in the fully expanded state, the processor 420 may perform control such that the flexible display 460 enters the partially expanded state or the reduced state, based on the type of running application (e.g., a content playback application (e.g., a media player application)) or the type of running file (e.g., video file or photo file). For example, in case that the type of the running application is a content playback application when the second input is received through the second input area in the fully expanded state, the processor 420 may perform control such that the display enters a partially expanded state corresponding to the ratio of the content playback screen, and in case that the type of the running application is not a content playback application when the second input is received through the second input area in the fully expanded state, the processor 420 may perform control such that the display enters a reduced state. For example, in case that the type of the running file is a video file or a photo file when the second input is received through the second input area in the fully expanded state, the processor 420 may perform control such that the display enters a partially expanded state corresponding to the aspect ratio of the video or photo, and in case that the type of the running file is not a video file or a photo file when the second input is received through the second input area in the fully expanded state, the processor 420 may perform control such that the display enters the reduced state. According to one embodiment, when the second input is received through the second input area in the fully expanded state, the processor 420 may display information (e.g., a pop-up menu) for selecting a partially expanded state or a reduced state, and may perform control such that the flexible display 460 enters the partially expanded state or the reduced state, based on the partially expanded state or the reduced state selected by a user.

In operation 1070, according to one embodiment, in the partially expanded state, the processor 420 may identify the first edge area of the flexible display 460 disposed in the first direction (e.g., the fixing direction, the opposite direction to the expansion direction, or the reduction direction) from a center of the flexible display 460 as a first input area (e.g., an input area for receiving a reduction (or slide-in) request input), and may identify a second edge area in the second direction (e.g., the expansion direction) as a second input area (e.g., an input area for receiving a reduction (or slide-in) request input).

In operation 1080, according to one embodiment, in the partially expanded state, the processor 420 may identify (or receive) a first input through the first input area or identify (or receive) a second input through the second input area.

In operation 1090, according to one embodiment, in the partially expanded state, the processor 420 may perform control such that the flexible display 460 enters a fully expanded state, based on identification of the first input through the first input area, and may perform control such that the flexible display 460 enters a reduced state, based on identification of the second input through the second input area.

Figure 11:
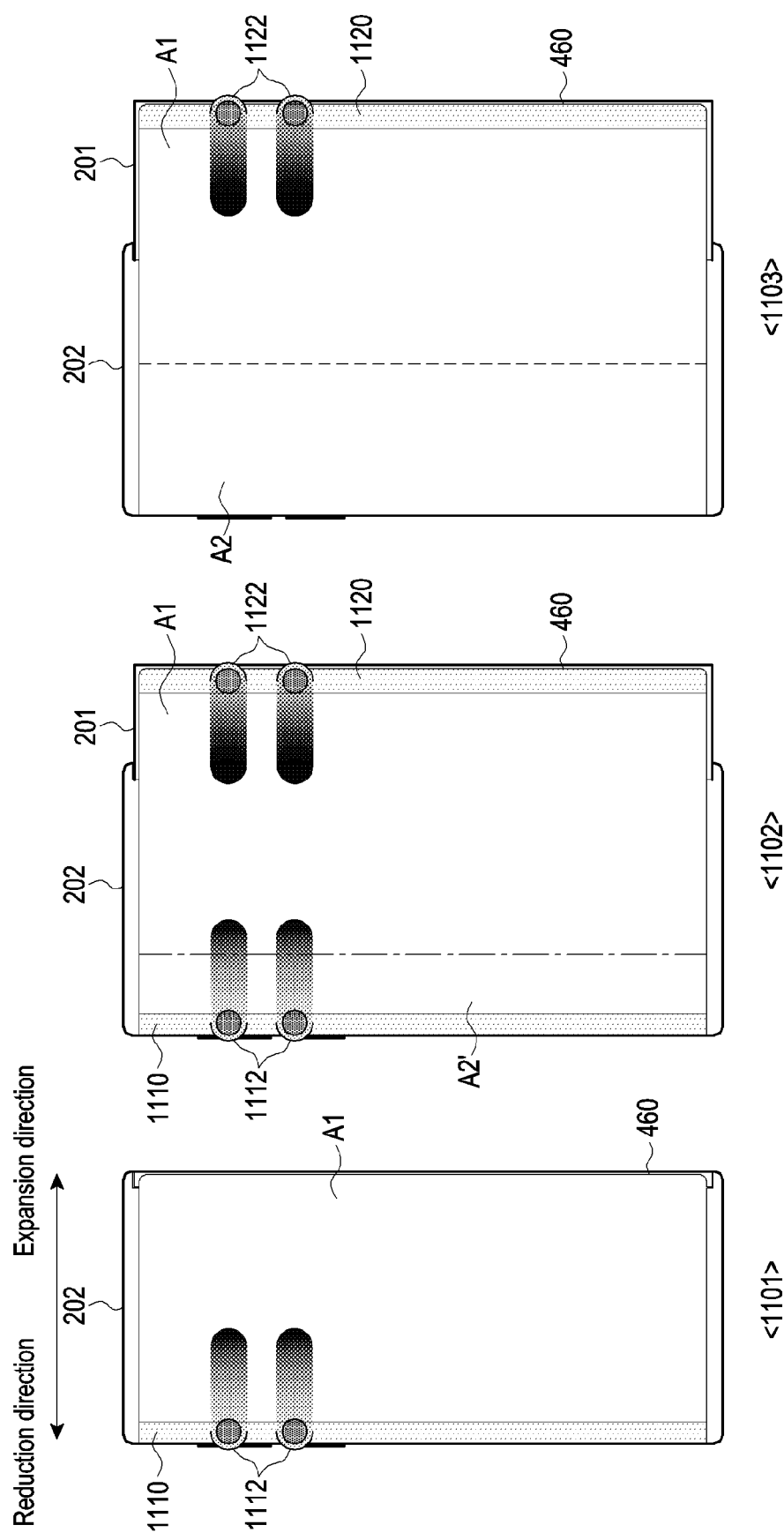
FIG. 11 illustrates a reduced state, a partially expanded state, and a fully expanded state of a display in an electronic device according to one embodiment.

FIG. 11 illustrates a reduced state, a partially expanded state, and a fully expanded state of a display in an electronic device according to one embodiment.

Referring to FIG. 11, according to one embodiment, the processor 420 may perform control such that the flexible display 460 enters one of a partially expanded state <1102> and a fully expanded state <1103>, based on a designated condition (e.g., a type of the first input, a type of an application to be executed upon the first input, a type of a file to be executed upon the first input, or a user selection input using a pop-up menu) when the first input 1112 is identified through the first input area 1110 in the reduced state <1101>. For example, at least a partial area (A2') of the display exposed based on the partial expansion in the partially expanded state <1102> may be a smaller than at least a partial area A2 of the display exposed based on the full expansion in the fully expanded state <1103>.

According to one embodiment, the processor 420 according to one embodiment may perform control such that the flexible display 460 enters a fully expanded state <1103> when the first input 1112 is identified through the first input area 1110 in the partially expanded state <1101>, and may perform control such that the flexible display 460 enters a reduced state <1101> when the second input 1122 is identified through the second input area 1120.

According to one embodiment, the processor 420 according to one embodiment may perform control such that the flexible display 460 enters one of a partially expanded state <1102> and a reduced state <1101>, based on a designated condition (e.g., a type of the second input, a type of an application to be executed upon the second input, a type of a file to be executed upon the second input, or a user selection input using a pop-up menu) when the second input 1122 is identified through the second input area 1120 in the full expanded state <1103>.

Figure 12:
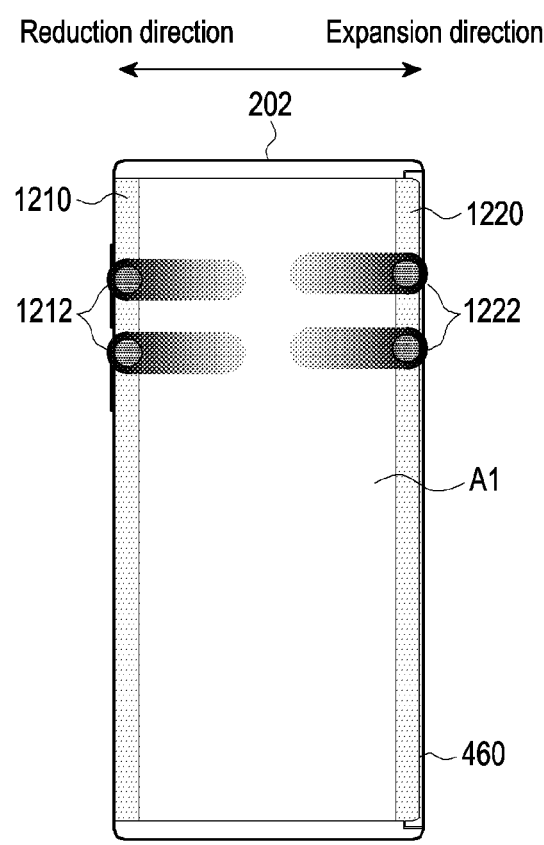
FIG. 12 illustrates an example in which a first edge area in a first direction of a display is designated as a first input area, and a second edge area in a second direction is designated as a second input area of a display according to one embodiment.

FIG. 12 illustrates an example in which a first edge area in a first direction of a display is designated as a first input area, and a second edge area in a second direction is designated as a second input area of a display according to one embodiment.

Referring to FIG. 12, according to one embodiment, the processor 420 according to one embodiment may perform operation by receiving the first input 1212 and/or the second input 1222 through the first input area 1210 and/or the second input area 1220 in a state in which the first edge area of the flexible display 460 disposed in the first direction (e.g., the fixing direction, the opposite direction to the expansion direction, or the reduction direction) from a center of the flexible display 460 is designated as the first input area (e.g., an input area for receiving a reduction (or slide-in) request input), and the second edge area in the second direction (e.g., the expansion direction) is designated as the second input area (e.g., an input area for receiving a reduction (or slide-in) request input) regardless of whether the current state of the electronic device 401 is the reduced state, a partially expanded state, and/or a fully expanded state.

Figure 13:
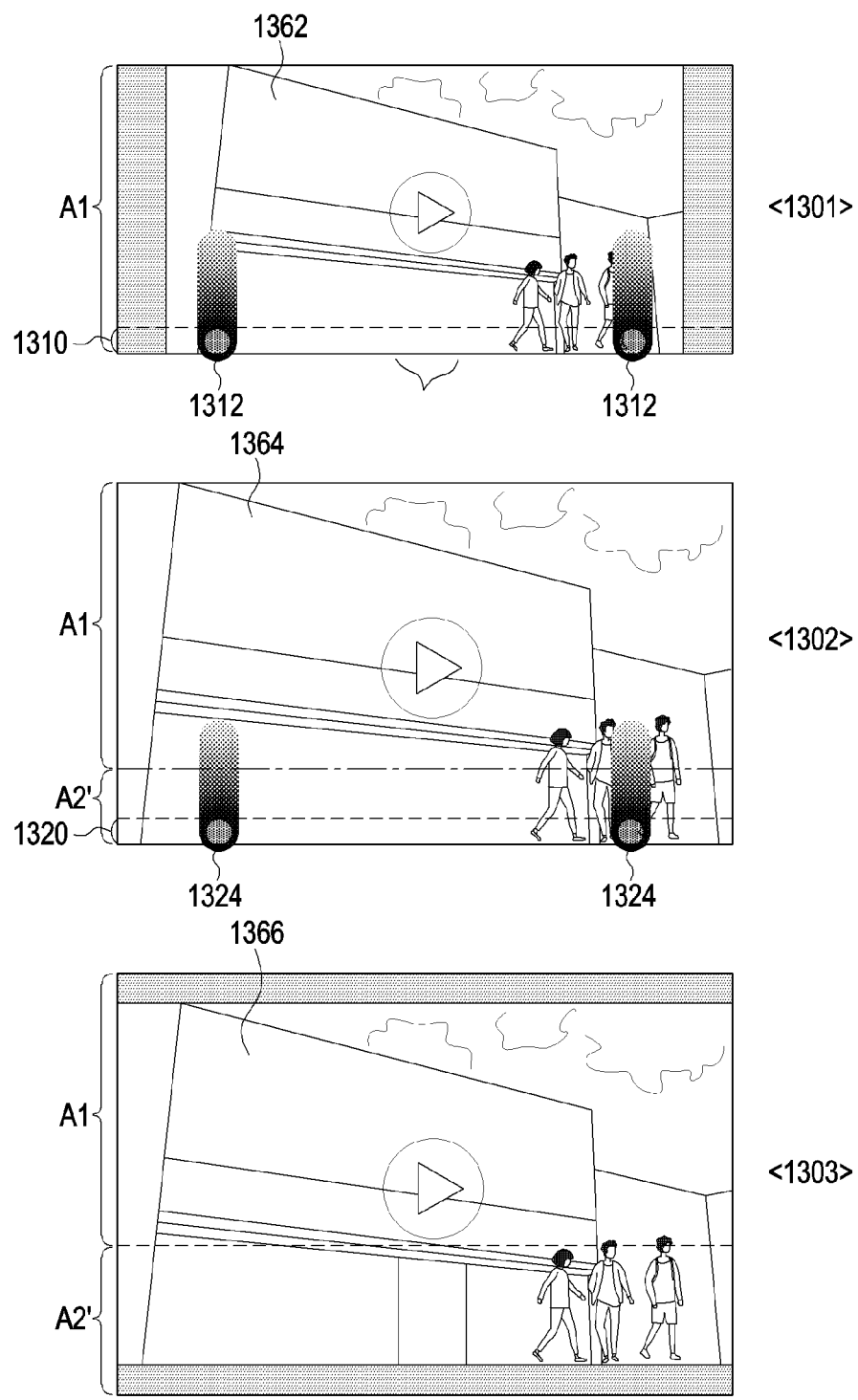
FIG. 13 illustrates an example in which an electronic device enters a partially expanded state or a fully expanded state during display of a content while the electronic device is in a reduced state and in a landscape view mode, according to one embodiment.

FIG. 13 illustrates an example in which an electronic device enters a partially expanded state or a fully expanded state during display of a content while the electronic device is in a reduced state and in a landscape view mode, according to one embodiment.

Referring to FIG. 13, according to one embodiment, the processor 420 may identify a first input 1312 through a first input area 1310 during display of a content (e.g., a video) 1362 on the first display area A1 while being in a landscape view mode and in a reduced state <1301>. For example, the first input area 1310 may be an area configured (or designated) on a portion or entire portion of the first edge area in the first direction (e.g., the fixing direction, the opposite direction to the expansion direction, or the reduction direction) in the landscape view mode and in a reduced state <1301>. For example, the first input 1312 may include a two-finger swipe down input to the first input area 1310. For example, the first input 1312 may be a gesture input other than a two-finger swipe down input.

According to one embodiment, based on an aspect ratio of a content 1362 when the first input 1312 is identified while the content 1362 is displayed on the first display area A1 in the landscape view mode and in reduced state <1301>, the processor 420 may perform control such that the state of the display enters a partially expanded state <1302> corresponding to (or suitable for) the aspect ratio, and may display the content 1362 in the display area (A1+A2') corresponding to the partially expanded state. According to one embodiment, the processor 420 may identify the second input 1324 through the second input area 1320 in the landscape view mode and in the partially expanded state <1302>. For example, the second input area 1320 may be an area configured (or designated) on a portion or entire portion of the second edge area in the first direction (e.g., the fixing direction, the opposite direction to the expansion direction, or the reduction direction) in the landscape view mode and in the partially expanded state <1302>. For example, as the reduced state <1301> becomes the partially expanded state <1302>, the first edge area and the second edge area may be different. For example, the second input 1324 may include a two-finger swipe down input. For example, the second input 1324 may be a gesture input other than a two-finger swipe down input. According to one embodiment, when the second input is received through the second input area 1320 in the partially expanded state <1302> and in the landscape view mode, the processor 420 receives may perform control such that the display enters a fully expanded state <1303>, and may display the content 1362 in the display area A1+A2 corresponding to the fully expanded state.

Although it has been described with reference to the example of FIG. 13 that after expansion from the reduced state <1301> in the landscape view mode to the partially expanded state <1302>, based on the first input 1312, the processor 420 causes the partially expanded state <1302> to be the fully expanded state <1303>, based on the second input 1324, the operation of the partially expanded state <1302> may be omitted depending on the configuration. For example, the processor 420 may cause the reduced state <1301> in the landscape view mode to be the fully expanded state <1303> without the partially expanded state <1302>, based on a third input (not shown). For example, the third input may include a three-finger swipe down input. For example, the third input may be a different type of gesture input different from the first input, other than the three-finger swipe down input.

According to one embodiment, the processor 420 may select whether to operate to cause the reduced state <1301> in the landscape view mode to be the fully expanded state <1303> after the partially expanded state <1302> or to be the fully expanded state <1303> without the partially expanded state <1302>, based on whether an application is designated (or designated application type) or whether a file type is designated or based on user selection. For example, the designated application may include a media playback application or an over the top (OTT) application. For example, the designated file type may include a video file type file or a photo file type. For example, the user selection may include a partial expansion or full expansion selection using a pop-up menu, and when user selection is used, the processor 420 may display a pop-up menu, based on reception of an expansion command execution input in a reduced state, and the expansion may be performed according to the partial expansion or the full expansion selected by a user among the partial expansion or the full expansion included in the pop-up menu.

Figure 14:
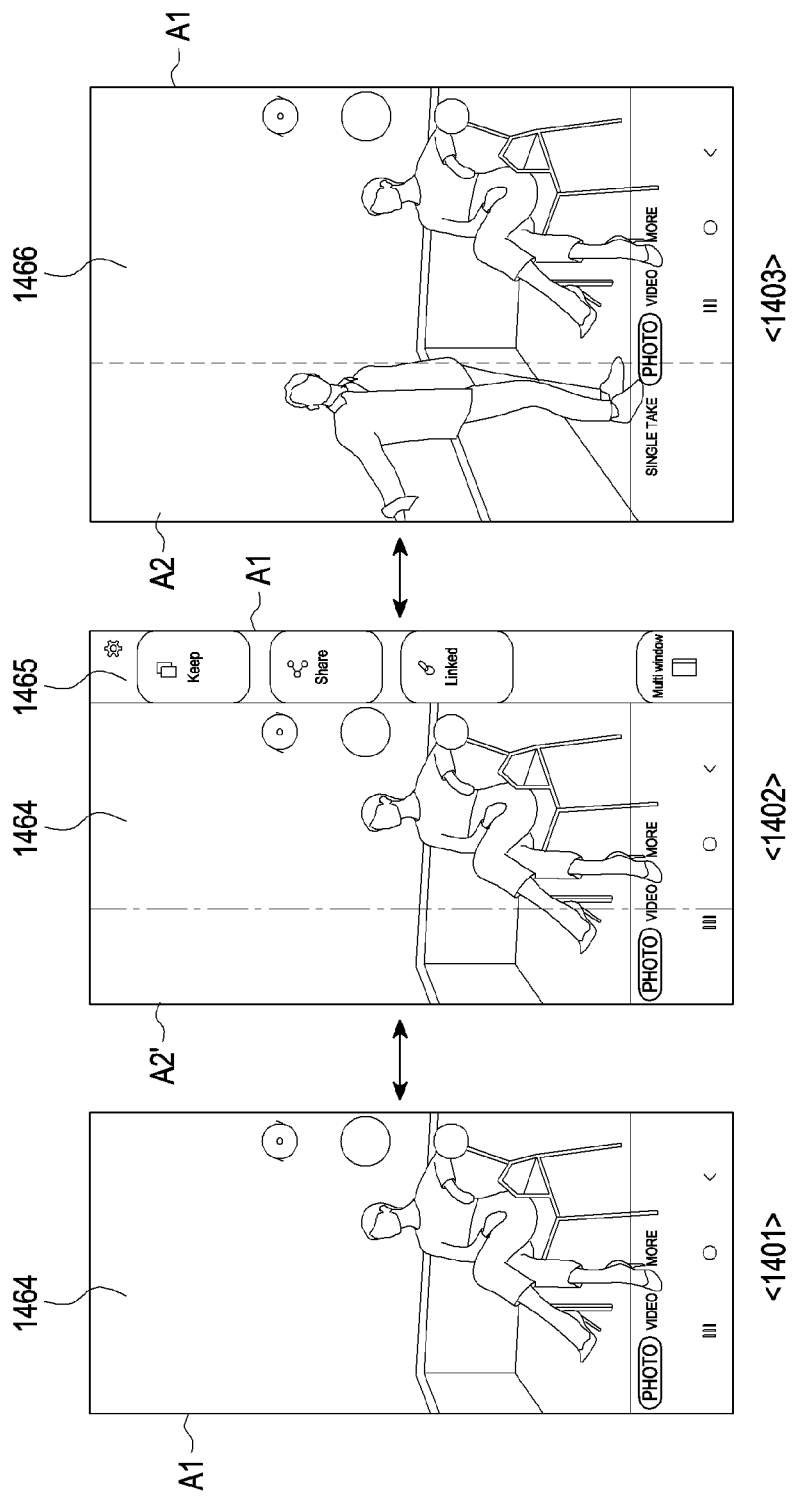
FIG. 14 illustrates an example of utilizing an expanded area when an electronic device transitions to a partially expanded state or a fully expanded state from a reduced state according to one embodiment.

FIG. 14 illustrates an example of utilizing an expanded area when an electronic device transitions to a partially expanded state or a fully expanded state from a reduced state according to one embodiment.

Referring to FIG. 14, according to one embodiment, the processor 420 may cause such that when the reduced state <1401> is changed to the partially expanded state <1402> during display of a first content (e.g., a first preview image) 1464 in the first display area A1, the display area is enlarged due to the expanded area (A2'), and accordingly, a second content (e.g., a menu associated with the first preview image) 1465 may be further displayed. According to one embodiment, the processor 420 according to one embodiment may cause such that when the partially expanded state <1402> is changed to the fully expanded state <1403>, the display has an area wider than that in the partially expanded state <1402> due to the expanded area A2. According to one embodiment, the processor 420 according to one embodiment may cause such that display displays, in the fully expanded state <1403>, the second content (e.g., a second preview image) 1466 having a screen size larger than that of the first content 1464.

Figure 15:
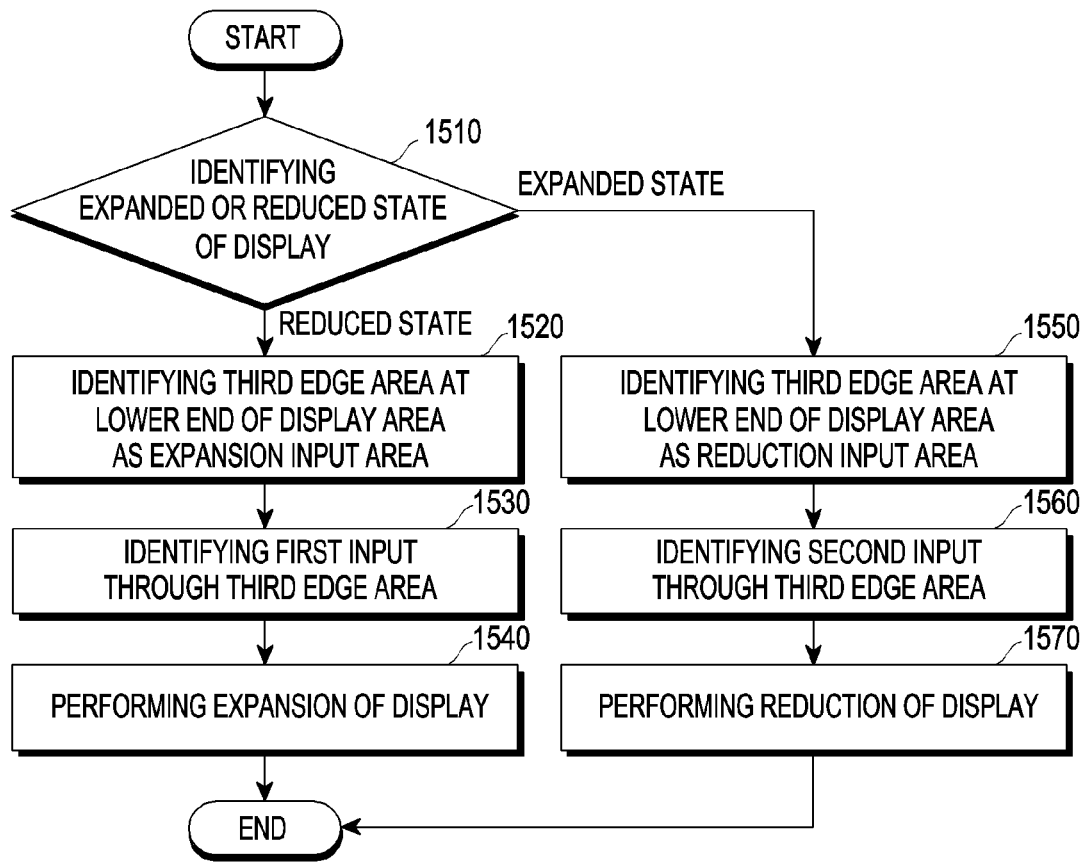
FIG. 15 is a flowchart showing a control operation when a third edge area at the lower end of a display is used as an input area for expanding or reducing the display in an electronic device according to one embodiment.

FIG. 15 is a flowchart showing a control operation when a third edge area at the lower end of a display is used as an input area for expanding or reducing the display in an electronic device according to one embodiment.

Referring to FIG. 15, according to one embodiment, the processor (e.g., the processor 120 of FIG. 1 or the processor 420 of FIG. 4) of the electronic device (e.g., the electronic device 101 of FIG. 1 or the electronic device 401 of FIG. 4) may perform at least one operation among the operations 1510 to 1570.

In operation 1510, according to one embodiment, the processor 420 may identify whether the state of the flexible display 460 is an expanded state (e.g., a partially expanded state or a fully expanded state) or a reduced state. According to one embodiment the processor 420 according to one embodiment may identify (confirm or determine or calculate) a distance (e.g., about several millimeters or centimeters) at which the first housing 201 (or at least a portion of the flexible display 460) is slid out from the second housing 202, by using information received from the sensor module 476 (e.g., at least one hall sensor 320), and therefore, may identify whether the state of the flexible display 460 is an expanded state (e.g., a partially expanded state or a fully expanded state) or a reduced state.

In operation 1520, according to one embodiment, in the reduced state, the processor 420 may identify the third edge area at the lower end of display 460 as an expansion input area (e.g., an input area for receiving an expansion (or slide-out) request input). According to one embodiment, the processor 420 may display, on at least a portion of the expansion input area, information (e.g., a GUI guide or an image) indicating that it is an expansion (or slide-out) request input area. For example, the display position, size, color, and/or type (text or image) of information indicating that it is an expansion (or slide-out) request input area may be designated by a user.

In operation 1530, according to one embodiment, the processor 420 may identify (or receive) a first input ((e.g., a multi-touch input, a multi-swipe input, a swipe input after a single long touch, or inputs through other designated input methods) through the third edge area of the lower end of the display in the reduced state.

In operation 1540, according to one embodiment, the processor 420 may perform expansion of a display. According to one embodiment, the processor 420 may control the slide driving unit 465 such that the flexible display 460 enters an expanded state, based on identification (reception) of the first input through the third edge area at the lower end of the display in the reduced state.

In operation 1550, according to one embodiment in the expanded state, the processor 420 may identify the third edge area at the lower end of display 460 as a reduction input area (e.g., an input area for receiving a reduction (or slide-in) request input). According to one embodiment, the processor 420 may display, on at least a portion of the reduction input area, information (e.g., a GUI guide or an image) indicating that it is a reduction (or slide-in) request input area. For example, the display position, size, color, and/or type (text or image) of information indicating that it is a reduction (or slide-in) request input area may be designated by a user.

In operation 1560, according to one embodiment, the processor 420 may identify (or receive) a second input ((e.g., a multi-touch input, a multi-swipe input, a swipe input after a single long touch, or inputs through other designated input methods) through the third edge area in the expanded state.

In operation 1570, according to one embodiment, the processor 420 may perform reduction of a display. According to one embodiment, the processor 420 may control the slide driving unit 465 such that the flexible display 460 enters a reduced state, based on identification (reception) of the second input through the third edge area.

Figure 16:
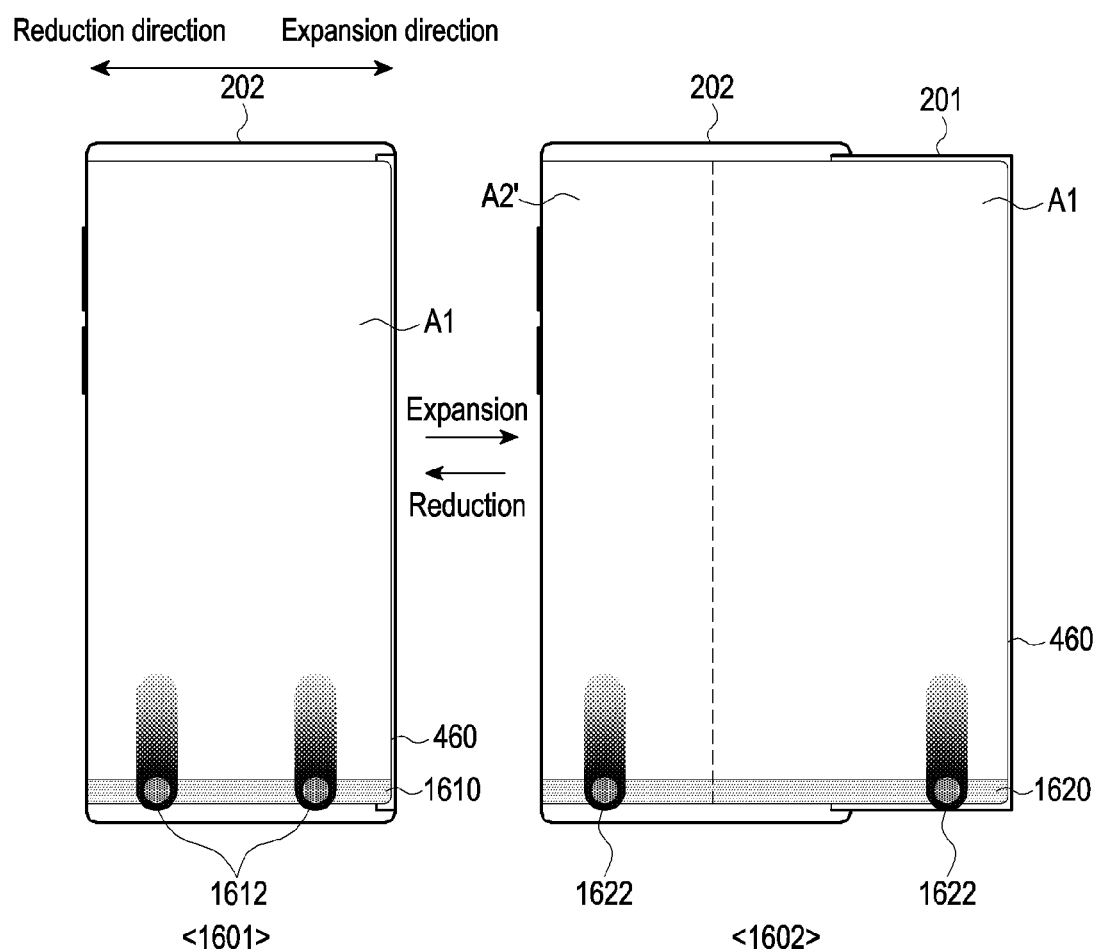
FIG. 16 illustrates an example of receiving a first input or a second input through a third edge area at the lower end of a display according to one embodiment.

FIG. 16 illustrates an example of receiving a first input or a second input through a third edge area at the lower end of a display according to one embodiment.

Referring to FIG. 16, according to one embodiment, the processor 420 may display a first display area A1 in the reduced state <1601>, and may identify a third edge area 1610 at the lower end of the flexible display 460 among the first display area A1 as the first input area (e.g., an input area for receiving an expansion (or slide-out) request input). According to one embodiment, the processor 420 may control the slide driving unit 465 such that the flexible display 460 moves in the expansion direction (slide-out direction) with respect to the second housing 202, based on a first input 1612 (e.g., a multi-touch swipe input in the top direction) to the first input area 1610. When the flexible display 460 is moved the maximum movable distance in the expansion direction (slide-out direction) with respect to the second housing 202, the flexible display 460 may be in a fully expanded state <1602>, and when the flexible display 460 is moved less than the maximum movable distance in the expansion direction (slide-out direction) with respect to the second housing 202, the flexible display 460 may be in a partially expanded state. In the fully expanded state <1602>, at least a portion (e.g., A2) of the flexible display 460 may be exposed to the front face of the electronic device, and thus the display area may be expanded.

Referring to FIG. 16, according to one embodiment, the processor 420 may perform display by using the first display area A1 and the expanded display area A2 in the expanded state (fully expanded state) <1602>, and may identify the third edge area at the lower end of the flexible display 460 as a second input area 1620 (e.g., an input area for receiving a reduction (or slide-in) request input). According to one embodiment, the processor 420 according to one embodiment may control the slide driving unit 465 such that the flexible display 460 moves in the reduction direction (slide-in direction) with respect to the second housing 202, based on the second input 1622 (e.g., a multi-touch swipe input in the top direction) to the second input area 1620. When the flexible display 460 is moved the maximum movable distance in the reduction direction (slide-in direction) with respect to the second housing 202, the display may be in a reduced state <1601>, and when the flexible display 460 is moved less than the maximum movable distance in the reduction direction (slide-in direction) with respect to the second housing 202, the flexible display 460 may be in a partially expanded state. In the reduced state <1601>, at least a portion (e.g., A2) of the flexible display 460 may not be exposed to the front face of the electronic device, and thus the display area may be reduced.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-volatile storage medium storing instructions which, when executed, cause an electronic device comprising at least one processor to perform at least one operation, and the at least one operation may include identifying a reduced state in which the flexible display is slid in the reduction direction or an expanded state in which the flexible display is slid in the expansion direction, in the reduced state, identifying a first edge area of the flexible display disposed in the reduction direction from a center of the flexible display as a first input area and performing control such that the flexible display enters the expanded state, based on reception of a first input through the first input area, and in the expanded state, identifying a second edge area of the flexible display disposed in the expansion direction from the center of the flexible display as a second input area and performing control such that the flexible display enters the reduced state, based on reception of a second input through the second input area.

The embodiments of the disclosure described and shown in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

What is claimed is:

1. An electronic device comprising:
   a first housing;
   a second housing configured to accommodate at least a portion of the first housing and connected to the first housing to enable sliding of the first housing;
   a flexible display connected to the first housing;
   a slide driving unit configured to slidingly move the first housing and the flexible display in an expansion direction or a reduction direction opposite to the expansion direction; and
   at least one processor,
   wherein the at least one processor is configured to,
   identify a reduced state in which the flexible display is slid in the reduction direction or an expanded state in which the flexible display is slid in the expansion direction,
   in the reduced state, identify a first edge area of the flexible display disposed in the reduction direction from a center of the flexible display as a first input area and control the slide driving unit such that the flexible display enters the expanded state, based on reception of a first input through the first input area, and
   in the expanded state, identify a second edge area of the flexible display disposed in the expansion direction from the center of the flexible display as a second input area and control the slide driving unit such that the flexible display enters the reduced state, based on reception of a second input through the second input area.

2. The electronic device of claim 1, further comprising:
   a magnet disposed in the first housing; and
   at least one hall sensor disposed in the second housing to sense a magnetic field generated by the magnet,
   wherein the at least one processor is configured to identify, by using the at least one hall sensor, a distance at which the flexible display is slid in the reduction direction or the expansion direction.

3. The electronic device of claim 1, wherein each of the first input and the second input comprises one of a swipe input after single long touch, a multi-swipe input, or a multi-touch input.

4. The electronic device of claim 1, wherein the at least one processor is configured to display, on at least a portion of the first edge area, first information indicating that the first edge area is an expansion request input area or display, on at least a portion of the second edge area, second information indicating that the second edge area is a reduction request input area.

5. The electronic device of claim 4, wherein the at least one processor is configured to designate a display position, size, color, or type of the first information or the second information, based on a user input.

6. The electronic device of claim 1, wherein the at least one processor is configured to identify whether the expanded state is a partially expanded state or a fully expanded state.

7. The electronic device of claim 1, wherein the at least one processor is configured to,
   when the first input is received through the first input area in the reduced state, identify whether the first input is a partial expansion request input or a full expansion request input, based on a designated condition,
   control the slide driving unit such that the flexible display enters a partially expanded state, based on identification of the partial expansion request input, and
   control the slide driving unit such that the flexible display enters a fully expanded state, based on identification of the full expansion request input.

8. The electronic device of claim 7, wherein the designated condition comprises one of a type of the first input, a type of an application to be executed upon the first input, a type of a file to be executed upon the first input, or a user selection input using a pop-up menu.

9. The electronic device of claim 1, wherein the at least one processor is configured to,
   when the second input is received through the second input area in the expanded state, identify whether the second input is a partial expansion request input or a reduction request input, based on a designated condition,
   control the slide driving unit such that the flexible display enters a partially expanded state, based on identification of the partial expansion request input, and
   control the slide driving unit such that the flexible display enters the reduced state, based on identification of the reduction request input.

10. The electronic device of claim 1, wherein the at least one processor is configured to,
    in the reduced state, identify a third edge area of the flexible display disposed in a bottom direction from a center of the electronic device as the first input area, and
    in the expanded state, identify the third edge area as the second input area.

11. A method for controlling an input area for expansion or reduction of a display in an electronic device, the method comprising:
    identifying a reduced state in which a flexible display is slid in a reduction direction or an expanded state in which the flexible display is slid in an expansion direction, wherein the expansion direction is opposite to the reduction direction;
    in the reduced state, identifying a first edge area of the flexible display disposed in the reduction direction from a center of the flexible display as a first input area and performing control such that the flexible display enters the expanded state, based on reception of a first input through the first input area; and
    in the expanded state, identifying a second edge area of the flexible display disposed in the expansion direction from the center of the flexible display as a second input area and performing control such that the flexible display enters the reduced state, based on reception of a second input through the second input area.

12. The method of claim 11, further comprising:
    identifying a distance at which the flexible display is slid in the reduction direction or the expansion direction, by using a magnet disposed in a first housing of the electronic device, and at least one hall sensor disposed in a second housing of the electronic device to sense a magnetic field generated by the magnet.

13. The method of claim 11, wherein each of the first input and the second input comprises one of a swipe input after single long touch, a multi-swipe input, or a multi-touch input.

14. The method of claim 11, further comprising:
    displaying, on at least a portion of the first edge area, first information indicating that the first edge area is an expansion request input area or displaying, on at least a portion of the second edge area, second information indicating that the second edge area is a reduction request input area.

15. The method of claim 14, further comprising:

designating a display position, size, color, or type of the first information or the second information, based on a user input.

16. The method of claim 11, further comprising:

identifying whether the expanded state is a partially expanded state or a fully expanded state.

17. The method of claim 11, further comprising:

when the first input is received through the first input area in the reduced state, identifying whether the first input is a partial expansion request input or a full expansion request input, based on a designated condition; and performing control such that the flexible display enters a partially expanded state, based on identification of the partial expansion request input or performing control such that the flexible display enters a fully expanded state, based on identification of the full expansion request input.

18. The method of claim 17, wherein the designated condition comprises one of a type of the first input, a type of an application to be executed upon the first input, a type of a file to be executed upon the first input, or a user selection input using a pop-up menu.

19. The method of claim 11, further comprising:

in the reduced state, identifying a third edge area of the flexible display disposed in a bottom direction from a center of the electronic device as the first input area; and in the expanded state, identifying the third edge area as the second input area.

20. A non-volatile storage medium that stores instructions which, when executed by an electronic device, cause the electronic device to perform at least one operation, the at least one operation comprising:

identifying a reduced state in which a flexible display is slid in a reduction direction or an expanded state in which the flexible display is slid in an expansion direction, wherein the expansion direction is opposite to the reduction direction;

in the reduced state, identifying a first edge area of the flexible display in the reduction direction from a center of the flexible display as a first input area and performing control such that the flexible display enters the expanded state, based on reception of a first input through the first input area; and in the expanded state, identifying a second edge area of the flexible display in the expansion direction from a center of the flexible display as a second input area and performing control such that the flexible display enters the reduced state, based on reception of a second input through the second input area.

* * * * *